(12) United States Patent
Lu et al.

(10) Patent No.: US 12,119,678 B2
(45) Date of Patent: Oct. 15, 2024

(54) CONTAINER AND LID AND ATTACHMENT THEREOF

(71) Applicant: EVOLUTIVE LABS CO., LTD., Taipei (TW)

(72) Inventors: Jui-Chen Lu, Taichung (TW); Ching-Yu Wang, Taichung (TW); Yu-Ting Hung, Taichung (TW); Yu-Chang Chiang, Taipei (TW); Cheng-Che Ho, Taichung (TW)

(73) Assignee: EVOLUTIVE LABS CO., LTD., Taipei (TW)

( * ) Notice: Subject to any disclaimer, the term of this patent is extended or adjusted under 35 U.S.C. 154(b) by 1 day.

(21) Appl. No.: 18/318,743

(22) Filed: May 17, 2023

(65) Prior Publication Data

US 2024/0154469 A1     May 9, 2024

Related U.S. Application Data

(60) Provisional application No. 63/458,172, filed on Apr. 10, 2023, provisional application No. 63/458,171, filed on Apr. 10, 2023, provisional application No. 63/423,067, filed on Nov. 7, 2022.

(30) Foreign Application Priority Data

Jan. 18, 2023    (TW) ................................ 112102450

(51) Int. Cl.
    *H02J 50/90*       (2016.01)
    *B65D 43/02*       (2006.01)
    *H02J 50/10*       (2016.01)

(52) U.S. Cl.
CPC .......... *H02J 50/90* (2016.02); *B65D 43/0202* (2013.01); *H02J 50/10* (2016.02); *B65D 2543/00092* (2013.01)

(58) Field of Classification Search
CPC ...... H02J 50/90; H02J 50/10; B65D 43/0202; B65D 2543/00092; B65D 43/02
See application file for complete search history.

(56) References Cited

U.S. PATENT DOCUMENTS

| | | |
|---|---|---|
| 9,668,597 B2 | 6/2017 | Ni |
| 2011/0192857 A1 | 8/2011 | Rothbaum et al. |
| 2017/0013950 A1 | 1/2017 | Rieger |
| 2017/0245624 A1 | 8/2017 | Neves |
| 2018/0228280 A1 | 8/2018 | Li et al. |
| 2019/0075914 A1 | 3/2019 | Teper et al. |

(Continued)

FOREIGN PATENT DOCUMENTS

| | | |
|---|---|---|
| CN | 209498990 U | 10/2019 |
| CN | 214731303 U | 11/2021 |

(Continued)

*Primary Examiner* — Robert L Deberadinis

(57) ABSTRACT

A container for containing food or liquid is provided. The container includes a body portion, a lid and an attachment. The lid is detachably disposed on the body portion. The attachment includes a magnetic attraction member and a connecting structure. The magnetic attraction member is independent from the lid and adapted to be magnetically connected to a mobile electronic device. The connecting structure is disposed between the magnetic attraction member and the container for selectively fixing the magnetic attraction member at a first position or a second position. At least a portion of the connecting structure is fixed to the container.

29 Claims, 20 Drawing Sheets

(56) References Cited

U.S. PATENT DOCUMENTS

| | | |
|---|---|---|
| 2021/0179321 A1 | 6/2021 | Karbakhsh |
| 2021/0204664 A1 | 7/2021 | Fromme |
| 2022/0055798 A1 | 2/2022 | Morris et al. |
| 2023/0233006 A1 | 7/2023 | Alves et al. |

FOREIGN PATENT DOCUMENTS

| | | |
|---|---|---|
| CN | 217659136 U | 10/2022 |
| CN | 218605521 U | 3/2023 |
| DE | 202023105647 U1 | 10/2023 |
| TW | 201615515 A | 5/2016 |

CONTAINER AND LID AND ATTACHMENT THEREOF

CROSS-REFERENCE TO RELATED APPLICATION

This non-provisional application claims priority under 35 U.S.C. § 119(a) on Patent Application No. 112102450 filed in Taiwan, R.O.C. on Jan. 18, 2023 and under 35 U.S.C. § 119(e) on U.S. provisional Patent Application Ser. Nos 63/423,067, 63/458,171 and 63/458,172 respectively filed on Nov. 7, 2022, Apr. 10, 2023 and Apr. 10, 2023, the entire contents of which are hereby incorporated by reference.

BACKGROUND OF THE INVENTION

1. Field of the Invention

The present disclosure relates to a container for containing food or liquid, and a lid and an attachment thereof. Particularly, it relates to a container, a lid and an attachment capable of magnetically attracting a mobile electronic device to a specific position.

2. Description of the Related Art

With the rapid development of technology, people are increasingly using mobile electronic devices such as smart phones, smart watches and tablets. Besides, as social software such as Instagram, Tiktok and Lasso become popular, many people are committed to taking short video with their own personal styles, upload these short video to social platforms and share them with friends or netizens in real time, which makes online video gradually replace traditional TV programs as one of the mainstream media.

Taking the fitness group as an example. People usually need to watch instructional video on the internet or record body movements during training to facilitate posture adjustment or repeated exercises when exercising in the gym. However, since users need to move routinely during training, or their hands need to hold training equipment such as dumbbells, barbells or handles for a long time, it is difficult to maintain the mobile electronic devices at a specific position in a handheld manner. Therefore, some users support the mobile electronic devices on the fitness equipment, or purchase mobile phone holders with tripods or wall-mounting accessories to fix the devices. Thus, the users have to carry additional attachments to fix the devices besides fundamental fitness goods such as water bottles and towels, which causes inconvenience in use.

BRIEF SUMMARY OF THE INVENTION

Aspects and advantages of embodiments of the present disclosure will be set forth in part in the following description, or may be learned from the description, or may be learned through practice of the embodiments.

An example aspect of the present disclosure is directed to an attachment adapted for a container for containing food or liquid. The container has a lid. The attachment includes a magnetic attraction member and a connecting structure. The magnetic attraction member is independent from the lid and adapted to be magnetically connected to a mobile electronic device. The connecting structure is disposed between the magnetic attraction member and the container for selectively fixing the magnetic attraction member at a first position or a second position. At least a portion of the connecting structure is fixed to the container.

In some implementations, the magnetic attraction member includes a magnetic attraction portion and a base portion. The magnetic attraction portion and the base portion stack up, or the magnetic attraction portion is accommodated in the base portion.

In some implementations, at least one magnetic attraction portion accommodating space is formed on the base portion. The magnetic attraction portion is accommodated in the magnetic attraction portion accommodating space.

In some implementations, the magnetic attraction portion accommodating space is plural. The magnetic attraction portion is detachably disposed in one of the magnetic attraction portion accommodating spaces.

In some implementations, the magnetic attraction portion is a permanent magnet or an electro-magnet. Otherwise, the magnetic attraction portion is a ferromagnetic material or a ferrimagnetic material adapted to be attracted by an external magnetic field.

In some implementations, the magnetic attraction member is homogeneous.

In some implementations, the magnetic attraction member includes magnetic powder. Otherwise, the magnetic attraction member includes ferromagnetic powder or ferrimagnetic powder adapted to be attracted by an external magnetic field.

In some implementations, the magnetic attraction member includes a polymeric material.

In some implementations, the magnetic attraction member is manufactured by injection molding.

In some implementations, the magnetic attraction member includes a positioning magnetic attraction portion. The positioning magnetic attraction portion is configured to be magnetically connected to a positioning feature of the electronic mobile device.

In some implementations, a positioning magnetic attraction accommodating portion configured to accommodate the positioning magnetic attraction portion is formed on the container.

In some implementations, the attachment further includes a power storage unit and electric coils. The electric coils are disposed at the magnetic attraction member and electrically connected to the power storage unit. The power storage unit is adapted to provide electricity to the electronic mobile device through the electric coils or store electricity received from the electronic mobile device.

In some implementations, the power storage unit includes a chargeable battery and a wire. The wire is connected between the chargeable battery and the electric coils and passes through the connecting structure.

In some implementations, the magnetic attraction member includes a main body portion and a biasing portion. An end of the biasing portion is pivoted to an end of the main body portion. A clearance is selectively formed between another ends of the biasing portion and the main body portion.

In some implementations, the magnetic attraction member further includes a biasing member disposed between the biasing portion and the main body portion.

In some implementations, a magnetic attraction member accommodating portion configured to accommodate the magnetic attraction member is formed on the container.

In some implementations, the magnetic attraction member includes an engaging portion configured to be selectively engaged to the container.

In some implementations, the magnetic attraction member is a MAGSAFE compatible interface.

In some implementations, the magnetic attraction member is C-shaped or closed ring-shaped.

In some implementations, the connecting structure includes a positioning member configured to fix the magnetic attraction member at the first position or the second position.

In some implementations, the magnetic attraction member includes a pivoting feature. The connecting structure includes a damping member engaged with the pivoting feature.

In some implementations, the connecting structure includes a hinge, a rotating shaft or a plug. The magnetic attraction member is pivoted to the hinge, the rotating shaft or the plug.

In some implementations, the connecting structure includes a hinge, a rotating shaft, a universal joint or a socket. The magnetic attraction member is pivoted to the container through the hinge, the rotating shaft, the universal joint or the socket.

In some implementations, the connecting structure includes a flexible member. An end of the flexible member is disposed at the container. The magnetic attraction member is disposed on another end of the flexible member.

In some implementations, the connecting structure includes a position limiting portion selectively abutting against the magnetic attraction member.

In some implementations, the container further includes a body portion. The lid is detachably disposed on the body portion. The connecting structure is disposed on the lid or the body portion.

Another example aspect of the present disclosure is directed to a container for containing food or liquid. The container includes a body portion, a lid and the attachment. The lid is detachably disposed on the body portion. The attachment is configured to be disposed on the lid or the body portion.

In some implementations, the container is a water bottle, a kettle, a pan, a pot or a can.

Another example aspect of the present disclosure is directed to a lid adapted for the attachment. The container includes a body portion. The lid is detachably disposed on the body portion.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION OF THE INVENTION

Figure 1:
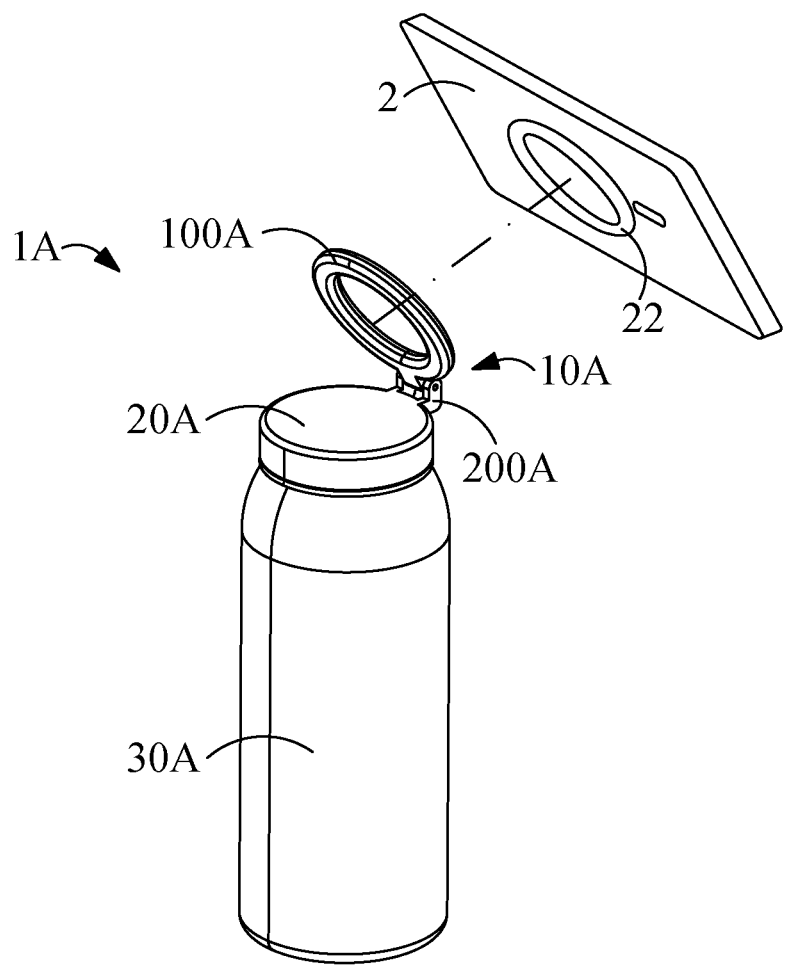
FIG. 1 is a perspective view of a container magnetically connected to a mobile electronic device according to some exemplary embodiments.

The aforementioned and other technical features, characteristics and effects of the present disclosure may be clearly presented by the detailed description of exemplary embodiments together with the attached figures. In addition, in the following embodiments, the same or similar components will use the same or similar reference numerals.

In addition, the methods, processes and steps disclosed by the embodiments are only illustrative and not intended to limit. Therefore, a person skilled in the art can appropriately increase, omit, modify or execute each method, process or step alone without departing from the spirit and the scope of the invention, unless the change results in timing or technical inconsistencies. Besides, the orders of each method, process or step can also be altered or adjusted.

Referring to FIG. 1. A container 1A for containing food or liquid in the embodiments may be a water bottle and may include an attachment 10A, a lid 20A and a body portion 30A. The attachment 10A is disposed on the lid 20A, and the lid 20A is detachably disposed on the body portion 30A. Besides, the attachment 10A may include a magnetic attraction member 100A and a connecting structure 200A. The magnetic attraction member 100A is independent from the lid 20A and adapted to be magnetically connected to a mobile electronic device 2, and the connecting structure 200A is disposed between the magnetic attraction member 100A and the lid 20A. It is worth mentioning that where "independent from the lid" used here indicates that the magnetic attraction member 100A and the lid 20A are not integrally formed, and the magnetic attraction member 100A is not integrated in the lid 20A, either. That is, the magnetic attraction member 100A and the lid 20A are two independent components. In other words, the magnetic attraction member 100A can move or rotate with respect to the lid 20A, or they can be arranged in different spatial spaces.

Figure 2:
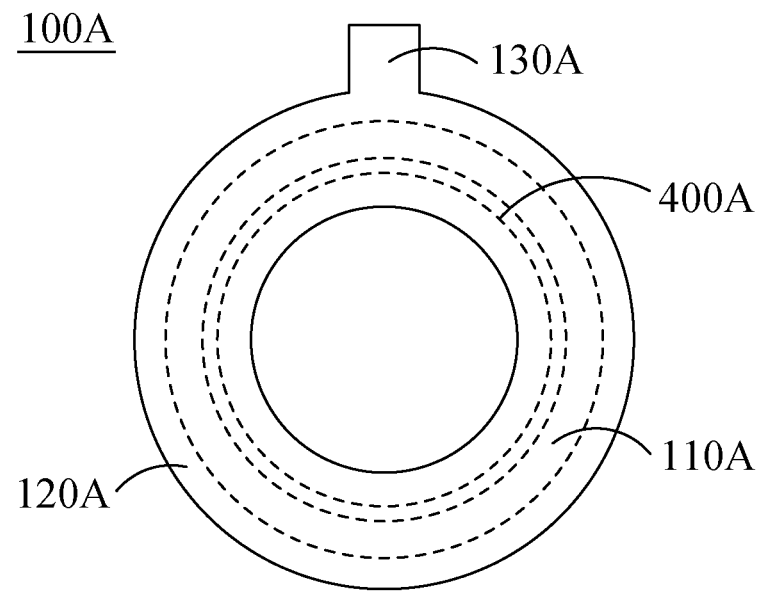
FIG. 2 is a top view of the magnetic attraction member in FIG. 1.
Figure 3:
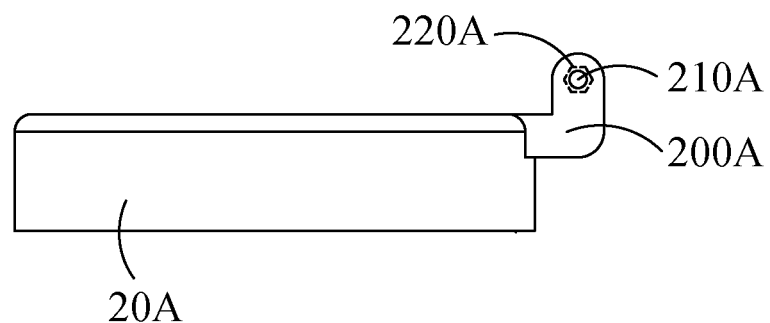
FIG. 3 is a side view of the lid and the connecting structure in FIG. 1.
Figure 4:
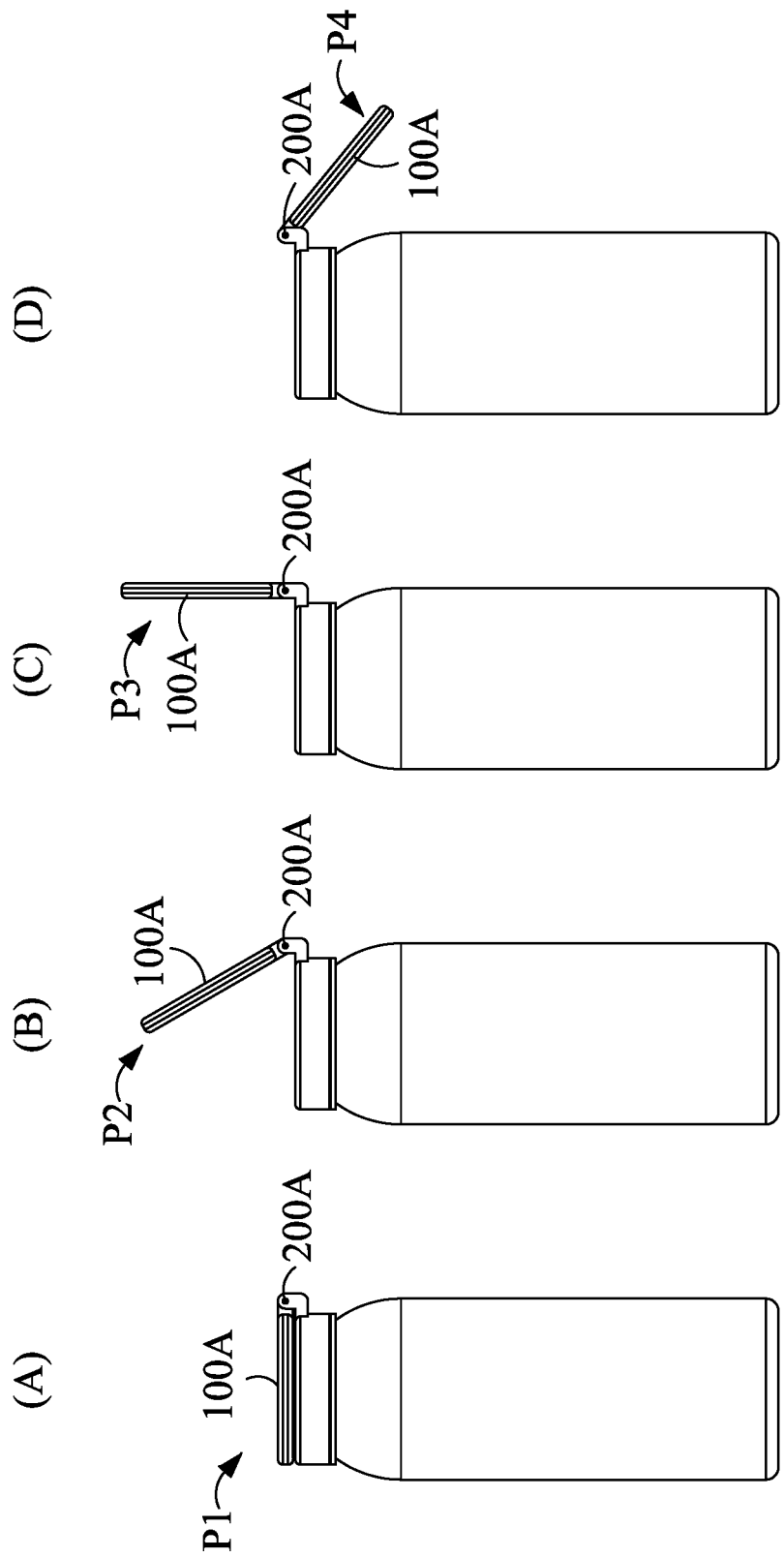
FIG. 4 is a side view of the container in FIG. 1 when the magnetic attraction member is positioned at (A) a first position; (B) a second position; (C) a third position; and (D) a fourth position.

Referring to FIGS. 2 to 4. Specifically, the mobile electronic device 2 may be a smart phone, a smart watch, a tablet or a power bank and has a magnetic portion 22 on a side face. The magnetic portion 22 may be magnet array components for MAGSAFE. On the other hand, the magnetic attraction member 100A may be a MAGSAFE compatible interface and include a magnetic attraction portion 110A and a base portion 120A. The magnetic attraction portion 110A may be a ring-shaped permanent magnet. The base portion 120A may have a size greater than the magnetic attraction portion 110A and may be formed by a metal or an alloy which does not block magnetic field lines, and the magnetic attraction portion 110A is accommodated in the base portion 120A. Thereby, the magnetic attraction member 100A can be magnetically connected with the mobile electronic device 2 through the magnetic attraction portion 110A and the magnetic portion 22 so as to magnetically attract and fix the mobile electronic device 2 on the container 1A through the magnetic attraction member 100A. Besides, the base portion 120A not only provides structural protection outside the magnetic attraction portion 110A, but allows the mobile electronic device 2 to be removed from the magnetic attraction portion 110A after use.

More specifically, the method of accommodating the magnetic attraction portion 110A in the base portion 120A includes but is not limited to forging two base parts with internal accommodating spaces whose dimensions and shapes are corresponding to the magnetic attraction portion 110A, and combining these two base parts through joining means such as welding or locking after disposing the magnetic attraction portion 110A into the internal accommodating spaces to form a base portion 120A sheathing outside the magnetic attraction portion 110A. Otherwise, manufacturers can also form a base portion 120A with specific thickness by directly coating on the magnetic attraction portion 110A.

It is worth mentioning that the magnetic attraction portion 110A in this embodiment is a ring-shaped permanent magnet though, the type and material of the magnetic attraction portion 110A is not limited thereto. For example, in some embodiments, the magnetic attraction portion 110A may also be flaky or a bulk. In addition, besides the permanent magnet, an electro-magnet that generates magnetic field after powered up, or a ferromagnetic or ferrimagnetic material that does not generate magnetic field itself but is passively attracted by an external magnetic field of the magnetic portion 22 may also be chosen to form the magnetic attraction portion 110A. On the other hand, besides metals and alloys, non-metallic materials such as plastic, rubber and wood may be chosen to manufacture the base portion 120A. Otherwise, leathers may be used to be directly wrapped on the outer surface of the magnetic attraction portion 110A to support and protect the magnetic attraction portion 110A.

As shown in FIG. 3, the connecting structure 200A may include a hinge attached on the lid 20A. A portion of the connecting structure 200A is fixed to the lid 20A, and the connecting structure 200A includes a pivoting member 210A. The pivoting member 210A may be a rotating shaft. On the other hand, the magnetic attraction member 100A may further include a pivoting portion 130A, and a pivoting hole for allowing the pivoting member 210A to pass through is formed on the pivoting portion 130A. Therefore, when the pivoting member 210A pass through the pivoting hole of the pivoting portion 130A, the magnetic attraction member 100A can be pivoted to the hinge or the lid 20A of the container 1A through the hinge so as to be movable or rotatable relative to the lid 20A. Moreover, since a portion of the connecting structure 200A is fixed to the container 1A, when the magnetic attraction member 100A is disposed on the container 1A through the connecting structure 200A, the magnetic attraction member 100A and the connecting structure 200A will not be lost due to being completely detached from the container 1A.

In some embodiments, the connecting structure 200A may further include a positioning member 220A. The positioning member 220A may be a positioning gear disposed on the pivoting member 210A, and a gear slot or a polygonal accommodating hole corresponding to the positioning gear is formed on the connecting structure 200A. Thereby, as shown in FIG. 4, when the magnetic attraction member 100A rotates to a first position P1, a second position P2, a third position P3 or a fourth position P4 through the pivoting member 210A, the connecting structure 200A can fix the magnetic attraction member 100A at the current position through the positioning member 220A. In other words, the connecting structure 200A is capable of selectively fixing the magnetic attraction member 100A at the first position P1 or the second position P2, and fixing the mobile electronic device 2 magnetically connected to the magnetic attraction member 100A together. Besides, since the magnetic attraction member 100A is independent from the lid 20A, while the magnetic attraction member 100A is magnetically connected to mobile electronic device 2, users can also detach the lid 20A from the body portion 30A and enjoy food or drink in the container 1A as usual. It is worth mentioning that manufacturers can arrange the weights, shapes and materials of the lid 20A and the body portion 30A based on actual need so that the container 1A can still maintain balance without falling over when the magnetic attraction member 100A is magnetically connected to mobile electronic device 2 even if there is no food or drink in it. In some embodiments, the positioning member 220A may also choose from positioning components such as a hook, a cam or a positioning pin. It is not limited by the embodiments.

Figure 5:
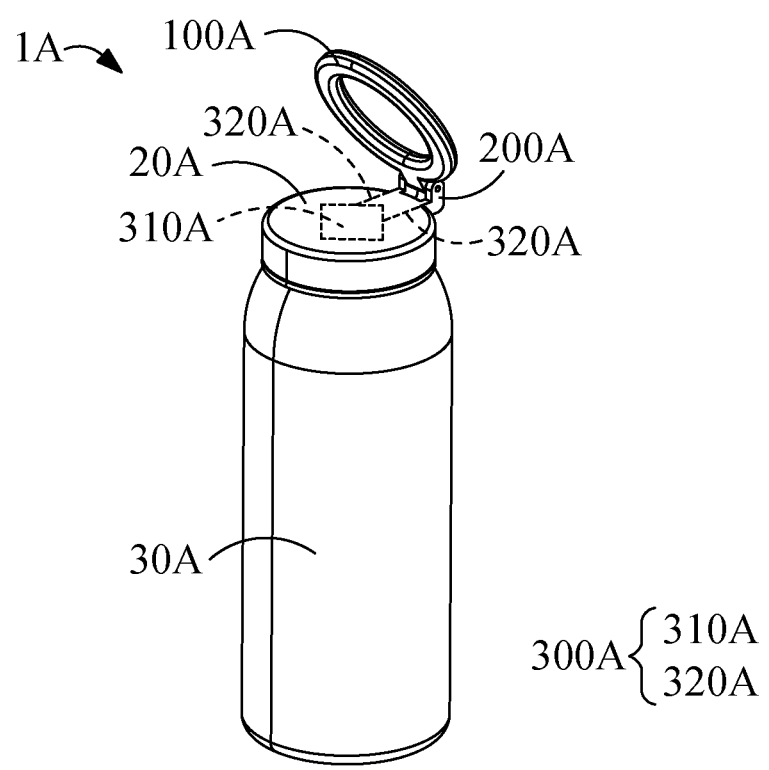
FIG. 5 is a perspective view of the container and its power storage unit in FIG. 1.

Referring to FIGS. 2 and 5. In some embodiments, the attachment 10A may further include a power storage unit 300A and electric coils 400A. The electric coils 400A are disposed in the magnetic attraction member 100A and electrically connected to the power storage unit 300A. Thereby, when load equipment such as smart phone, smart watch or tablet is magnetically connected to the magnetic attraction member 100A, the power storage unit 300A can supply the electricity stored therein to the mobile electronic device 2 through the electric coils 400A. Otherwise, when power type equipment such as power bank is magnetically connected to the magnetic attraction member 100A, the power storage unit 300A can also save electricity received from the mobile electronic device 2 through the electric coils 400A for the use of the load equipment when it is magnetically connected.

As shown in FIG. 5, the power storage unit 300A may include a chargeable battery 310A and a wire 320A. The wire 320A is connected between the chargeable battery 310A and electric coils 400A, and passes through the connecting structure 200A. In the embodiments, the chargeable battery 310A is disposed in the lid 20A, and the wire 320A passes through two sides of the lid 20A and the connecting structure 200A from the chargeable battery 310A and connects to the electric coils 400A. In this configuration, a better electrically connecting reliability is obtained between components. However, in other embodiments, the wire 320A may also be exposed at periphery of the lid 20A near the connecting structure 200A, pass through periphery of the base portion 120A near the pivoting portion 130A and be electrically connected to the electric coils 400A. By these arrangements, when users detach the lid 20A, the connecting structure 200A and the magnetic attraction member 100A attached on the lid 20A from the body portion 30A, the entire electric circuits will be removed simultaneously and a physical disconnection of the circuits is thus prevented. Besides, when the magnetic attraction portion 110A is selected from the electro-magnet, electricity can also be provided by the chargeable battery 310A to maintain the magnetic field continuously generated by the magnetic attraction portion 110A to magnetically connect the mobile electronic device 2.

It is worth mentioning that in other embodiments, a magnetic attraction member 100A with electric coils 400A may be also disposed on the lid 20A, and the chargeable battery 310A is disposed in the body portion 30A. Besides, the electrical connection between the chargeable battery 310A and the electric coils 400A is not limited by using of the wire 320A. For example, the power storage unit 300A may include another chargeable battery disposed adjacent and electrically connected to the electric coils 400A, and the specific process of the power supplying from the power storage unit 300A to the mobile electronic device 2 is: the chargeable battery 310A charges the chargeable battery adjacent and electrically connected to the electric coils 400A first when the magnetic attraction member 100A is located at the first position P1 in the FIG. 4, and the charged chargeable battery wirelessly charges the mobile electronic device 2 through the electric coils 400A when the mobile electronic device 2 is magnetically connected to the magnetic attraction member 100A. An indirect charge without arranging wires is thus realized.

Figure 6:
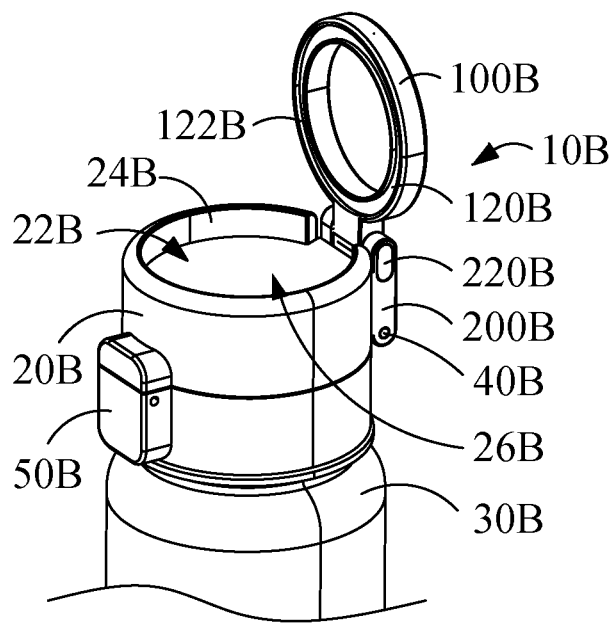
FIG. 6 is a partial perspective view of a container according to some exemplary embodiments.
Figure 7:
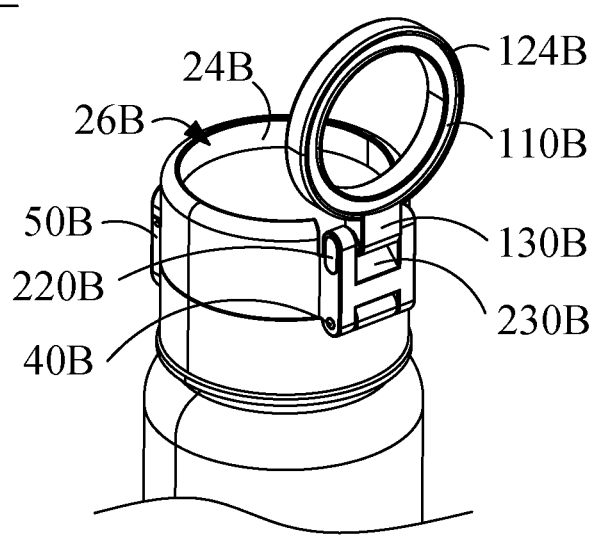
FIG. 7 is another partial perspective view of the container in FIG. 6.

Referring to FIGS. 6 and 7. The container 1B in this embodiment is similar to the container 1A in the previous embodiments. The main difference between them is that a magnetic attraction member accommodating portion 26B configured to accommodate the magnetic attraction member 100B is formed on the lid 20B of the container 1B.

As shown in FIGS. 6 and 7, the lid 20B has an upper surface 22B, and a flange 24B extruded relative to the upper surface 22B is formed on the periphery of the lid 20B. The flange 24B defines the magnetic attraction member accommodating portion 26B. In other words, the magnetic attraction member accommodating portion 26B may be a concaved portion with a shape and a size corresponding to the magnetic attraction member 100B, and the height of the flange 24B is designed to be substantially equal to or slightly greater than the thickness of the magnetic attraction member 100B. By the arrangement, when rotating near the upper surface 22B (e.g., to the first position P1 in FIG. 4), the magnetic attraction member 100B can be accommodated in the magnetic attraction member accommodating portion 26B, and the flange 24B can protect the magnetic attraction member 100B in the circumstantial and height direction of the lid 20B. Not only the magnetic attraction member 100B is thus easy to receive, but a risk of collisions of the magnetic attraction member 100B with external components to be damaged is avoided.

On the other hand, the attachment 10B in the embodiments can provide various magnetic connection direction based on user's usage habit. Specifically, the base portion 120B of the magnetic attraction member 100B has a first side and a second side opposite to the first side. The first side is closer to the upper surface 22B, and a magnetic attraction portion accommodating space is formed on at least one of the first side and the second side. In the embodiments, take a magnetic attraction portion accommodating space 122B being formed on the first side, and a magnetic attraction portion accommodating space 124B being formed on the second side as an example. The number of the magnetic attraction portions 110B is corresponding to the number of the magnetic attraction portion accommodating spaces. In other words, the magnetic attraction portions 110B are disposed in both of the magnetic attraction portion accommodating space 122B and the magnetic attraction portion accommodating space 124B. By the arrangement, users can choose an attachment 10B with a first side having the magnetic attraction portion accommodating space 122B, or choose another attachment 10B with a second side having the magnetic attraction portion accommodating space 124B, or choose another attachment 10B with both sides respectively having a magnetic attraction portion accommodating space based on their usage habit. The mobile electronic device 2 can be freely magnetically connected to the magnetic attraction portion 110B disposed in the magnetic attraction portion accommodating space 122B closed to the lid 20B or the magnetic attraction portion accommodating space 124B away from the lid 20B, and the purchasing and using flexibility of the attachment 10B is enhanced.

In some embodiments, it is also possible to dispose magnetic attraction portion accommodating spaces on both of the first side and the second side of the magnetic attraction member 100B, but only a magnetic attraction portion 110B is arranged. In this case, user can engage the magnetic attraction portion 110B into the corresponding magnetic attraction portion accommodating space according to different needs. Moreover, the width of the top portion (the portion away from the bottom) of the magnetic attraction portion accommodating space may be designed slightly greater than the width of the magnetic attraction portion 110B, which facilities users to disassemble the magnetic attraction portion 110B. Besides, the height of side walls of the magnetic attraction portion accommodating space may be designed slightly greater than the thickness of the magnetic attraction portion 110B, or a bonded or tight fitting relationship is formed between the magnetic attraction portion accommodating space and the magnetic attraction portion 110B. Thereby, when the magnetic attraction portion 110B is engaged in the magnetic attraction portion accommodating space, even if the mobile electronic device 2 is magnetically attracted by the magnetic attraction portion 110B, the magnetic attraction portion 110B will not be pulled out from the magnetic attraction portion accommodating space, impact with the magnetic attraction portion 110B, or be difficult to separate from the magnetic attraction portion 110B due to mutual magnetic attraction, either.

In addition, the connecting structure 200B in the embodiments integrates a function for the magnetic attraction member 100B to rotate relative to the lid 20B and a function for the lid 20B to rotate relative to the body portion 30B. In the embodiments, the connecting structure 200B is exemplary to be a biaxial hinge, and the lid 20B includes an upper lid portion and a lower lid portion. The upper lid portion can selectively open or close relative to the lower lid portion, and the lower lid portion is pivotally disposed on the body portion 30B to seal the opening of the body portion 30B. On the other hand, the container 1B may further include a lid shaft 40B and a knob 50B. The lid shaft 40B may be disposed at a lower end of the biaxial hinge, the pivoting portion 130B is disposed at an upper end of the biaxial hinge, and the lid shaft 40B and knob 50B are disposed between the upper lid portion and the lower lid portion. By the arrangement, when needing to rotate the magnetic attraction member 100B to different position, user can make the magnetic attraction member 100B and the upper lid portion separated by relative rotation between the pivoting portion 130B and the connecting structure 200B. When user would like to have the food or drink in the container 1B, he or she can operate the knob 50B to rotate the lid shaft 40B, and the upper lid portion is opened as the lower lid portion is kept on the body portion 30B, instead of detaching the whole lid 20B from the body portion 30B. The magnetic connection relationship between the magnetic attraction member 100B and the mobile electronic device 2 is also maintained. In other words, the container 1B can integrate rotations of two different components in a single connecting structure 200B so as to decrease complexity of the mechanism and an extra volume occupied with respect to the lid 20B and the body portion 30B. In some embodiments, the connecting structure 200B may further include a position limiting portion 230B. The position limiting portion 230B is exemplary to be an incline and disposed adjacent to the pivoting portion 130B. Thereby, when the magnetic attraction member 100B is rotated downward and far away from the lid 20B to a certain degree, the position limiting portion 230B will abut against the pivoting portion 130B and restrict the stroke of rotation of the magnetic attraction member 100B. In other words, the position limiting portion 230B can selectively abut against the magnetic attraction member 100B to limit the magnetic attraction member 100B.

Figure 8:
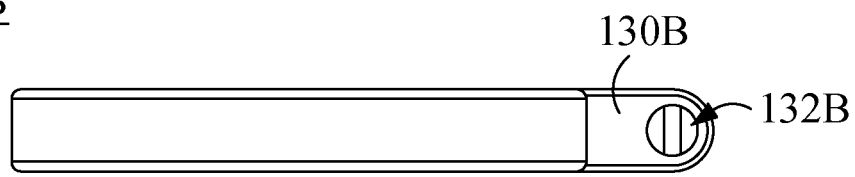
FIG. 8 is a side view of the magnetic attraction member in FIG. 6.
Figure 9:
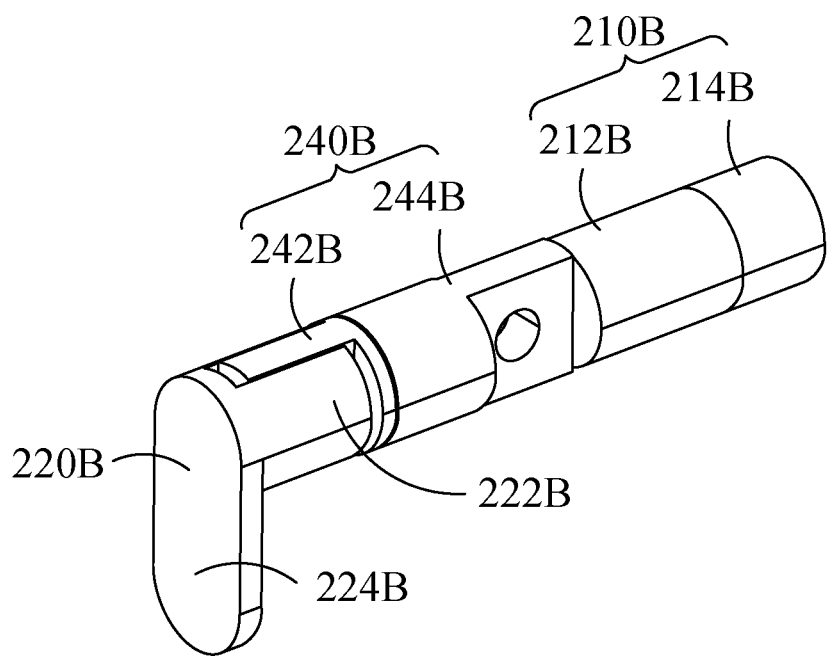
FIG. 9 is a perspective view of partial internal components of the connecting structure in FIG. 6.

Referring to FIGS. 7 to 9. Specifically, the attachment 10B has functions of automatic positioning and reducing abrasion. As shown in FIGS. 8 and 9, the pivoting portion 130B of the magnetic attraction member 100B includes a pivoting feature 132B. The pivoting feature 132B is exemplary to be a plank-shaped slot formed int the pivoting hole. The connecting structure 200B, besides the position limiting portion 230B, further includes a pivoting member 210B, a positioning member 220B and a damping member 240B.

The pivoting member 210B is exemplary to be a fixing pin and includes abutting portion 212B and a fitting portion 214B. The fitting portion 214B is fixed at an end of the abutting portion 212B, and the outer surface thereof is roughened (such as knurling) and has a slightly larger outer diameter than the abutting portion 212B. The positioning member 220B includes a positioning portion 222B configured to engage with the damping member 240B and a covering portion 224B connected to the positioning portion 222B and exposed on the outer surface of the connecting structure 200B. A long slot may be formed in the positioning portion 222B. The damping member 240B is exemplary to be a damping hinge, and includes a fixing portion 242B configured to engage with the positioning portion 222B and a rotating portion 244B pivoted to the fixing portion 242B and abutting against another end of the abutting portion 212B. Plank-shaped structures are formed on both of the fixing portion 242B and the rotating portion 244B. After the magnetic attraction member 100B is assembled with the connecting structure 200B, the pivoting member 210B is inserted into a shaft hole at the upper end of the connecting structure 200B by the abutting portion 212B. Since the outer surface of the fitting portion 214B is roughened and has a larger outer diameter than that of the abutting portion 212B, the pivoting member 210B will form a tight fit with the shaft hole at one of the ends. On the other hand, the plank-shaped structure at one end of the fixing portion 242B may be engaged into the long slot formed in the positioning portion 222B, and the positioning portion 222B and the fixing portion 242B remain relatively fixed in the circumstantial direction of the damping member 240B. In addition, the plank-shaped structure at one end of the rotating portion 244B is engaged with the pivoting feature 132B, and the magnetic attraction member 100B and the rotating portion 244B remain relatively fixed in the circumstantial direction by engagement between the pivoting feature 132B and the damping member 240B.

By the arrangement, when the magnetic attraction member 100B rotates relative to the lid 20B through the connecting structure 200B, the fixing portion 242B is kept fixed due to the engagement of the positioning portion 222B, and the rotating portion 244B will rotate synchronously with the pivoting feature 132B and relative to the fixing portion 242B. Because of the damping media such as torsion spring and damping fluid disposed between the fixing portion 242B and the rotating portion 244B, not only is the rotating force buffered by the damping member 240B to be reduced as it is too much, but the damping member 240B further keeps the magnetic attraction member 100B at a specific position based on a damping force generated by relative rotation between the fixing portion 242B and the rotating portion 244B as user stop the rotating. However, in some embodiments, the damping member 240B may be also configured to automatically relocate the magnetic attraction member 100B to the first position P1 when user detaches the mobile electronic device 2. It is not limited by the embodiments.

Figure 10:
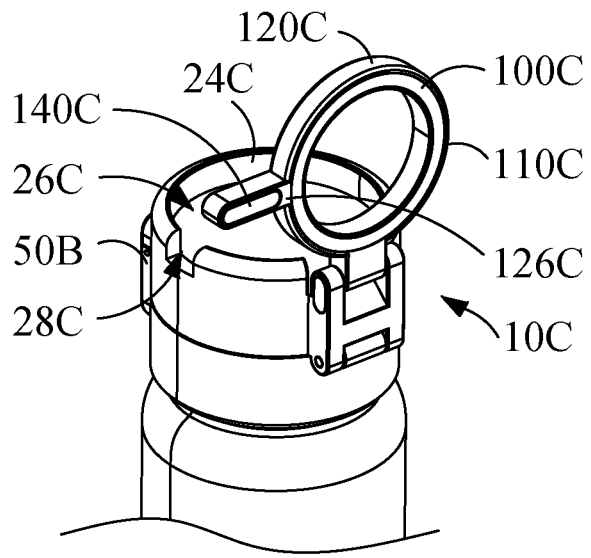
FIG. 10 is a partial perspective view of a container according to some exemplary embodiments.

Referring to FIG. 10. The container 1C in the embodiments is substantially similar to the container 1B in the previous embodiments. The main difference between them is that the magnetic attraction member 100C of the attachment 10C further includes a positioning magnetic attraction portion 140C.

Figure 11:
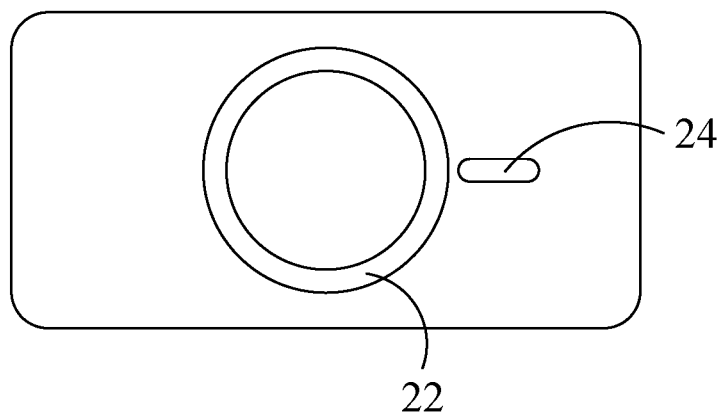
FIG. 11 is a rear view of a mobile electronic device according to some exemplary embodiments.
Figure 12:
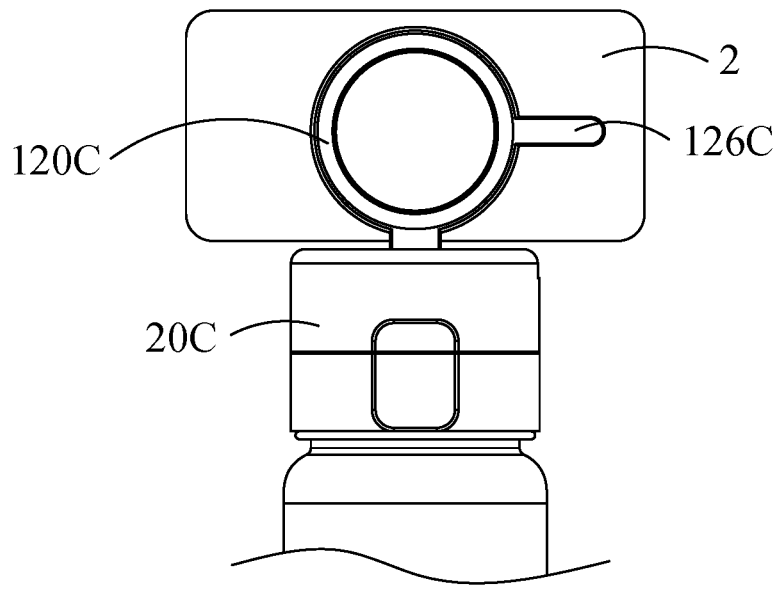
FIG. 12 is a rear view of the container in FIG. 10 magnetically connected to the mobile electronic device in FIG. 11 through the magnetic attraction member.

Referring to FIGS. 11 and 12. Specifically, the mobile electronic device 2 further includes a positioning feature 24 on the surface attached with the magnetic portion 22. The positioning feature 24 is exemplary to be a positioning magnet or a magnetic tape. Besides, an extending arm 126C is formed in the circumstantial direction of the base portion 120C, and the positioning magnetic attraction portion 140C is disposed on the side attached with the magnetic attraction portion 110C of the extending arm 126C. The positioning magnetic attraction portion 140C is exemplary to be a magnet bar configured to be magnetically connected to the positioning feature 24 of the mobile electronic device 2. In the embodiments, the numbers of the extending arm 126C, the positioning magnetic attraction portion 140C and the positioning feature 24 are the same to be one. By the arrangement, when the magnetic attraction member 100C is magnetically connected to the mobile electronic device 2 as shown in FIG. 12, besides the mobile electronic device 2 is kept not to be detached from the magnetic attraction member 100C by the magnetic connection between the magnetic portion 22 and the magnetic attraction portion 110C, the mobile electronic device 2 is maintained without rotation relative to the magnetic attraction member 100C by the magnetic connection between the positioning magnetic attraction portion 140C and the positioning feature 24. The using stability of the mobile electronic device 2 is thus further enhanced.

In some embodiments, the lid 20C may further has a positioning magnetic attraction accommodating portion 28C. In the embodiments, the positioning magnetic attraction accommodating portion 28C is exemplary to be a concaved portion on the flange 24C, and its position is corresponding to the positioning magnetic attraction portion 140C when the magnetic attraction member 100C rotates to the first position P1 as shown in FIG. 4. Thereby, when the magnetic attraction member 100C rotates to be accommodated in the magnetic attraction member accommodating portion 26C, the extending arm 126C and the positioning magnetic attraction portion 140C can also be accommodated in the positioning magnetic attraction accommodating portion 28C without blocking with the flange 24C to make the magnetic attraction member 100C entirely collapsed.

Figure 13:
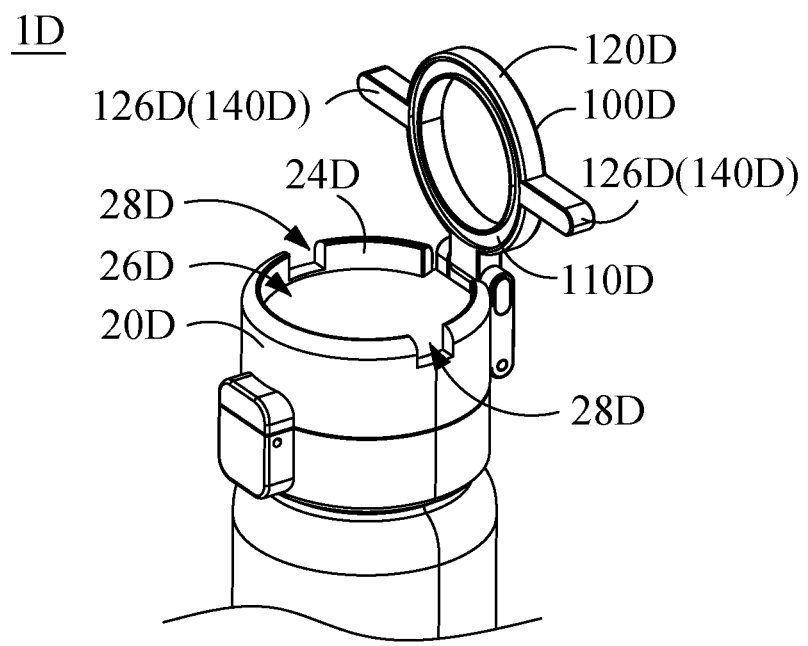
FIG. 13 is a partial perspective view of a container according to some exemplary embodiments.

Referring to FIG. 13. The container 1D in the embodiments is substantially similar to the container 1C in the previous embodiments. The main difference between them is that the magnetic attraction member 100D includes two positioning magnetic attraction portions 140D, and these positioning magnetic attraction portions 140D are disposed at different positions in the circumstantial direction of the magnetic attraction member 100D.

Specifically, the base portion 120D also has two extending arms 126D, and the positioning magnetic attraction portions 140D are respectively disposed on one of the extending arms 126D. By the arrangement, user can locate the positioning feature 24 to a suitable positioning magnetic attraction portion 140D based on the usage need of the mobile electronic device 2 (e.g., a filming angle or a viewpoint of video) to increase the using flexibility of the mobile electronic device 2. It is worth mentioning that the two extending arms 126D and the two positioning magnetic attraction portions 140D are exemplary to be disposed at opposite positions of the magnetic attraction member 100D in the embodiments (i.e., they are separated by 180 degrees), it is not limited thereto. According to actual usage needs, the number of the extending arms 126D and the positioning magnetic attraction portions 140D may also be three, four or more, and their positions are not necessary to be equal spaced. In other words, they may be centralized on the upper half portion of the magnetic attraction member 100D.

Furthermore, in some embodiments, the magnetic attraction portions 110D may be disposed on both of the first side and the second side of the base portion 120D. Meanwhile, a positioning magnetic attraction portion 140D is disposed on the first side of the extending arm 126D at the right side in FIG. 13, and another positioning magnetic attraction portion 140D is disposed on the second side of the extending arm 126D at the left side in FIG. 13. Thereby, whether the mobile electronic device 2 is magnetically connected to the magnetic attraction portion 110D on the first side or the second side, there is always a positioning magnetic attraction portion 140D located at the same relative position to be magnetically connected to the positioning feature 24.

As shown in FIG. 13, the positioning magnetic attraction accommodating portions 28D are formed at all positions on the flange 24D corresponding to the positioning magnetic attraction portions 140D. That is, the shapes, sizes and numbers of the positioning magnetic attraction accommodating portions 28D are corresponding to those of the positioning magnetic attraction portions 140D. Therefore, when the magnetic attraction member 100D rotates to be accommodated in the magnetic attraction member accommodating portion 26D, the extending arms 126D and the positioning magnetic attraction portions 140D can also be accommodated in the positioning magnetic attraction accommodating portions 28D without blocking with the flange 24D to make the magnetic attraction member 100D entirely collapsed.

Figure 14:
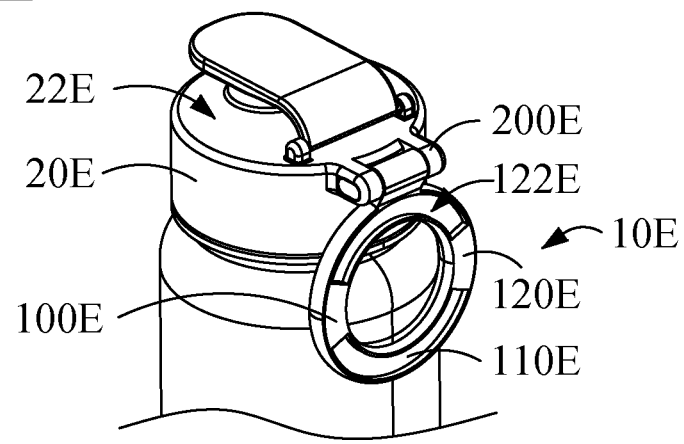
FIG. 14 is a partial perspective view of a container according to some exemplary embodiments.

Referring to FIG. 14. The container 1E in the embodiments is substantially similar to the container 1B in the previous embodiments. The main difference between them is that the connecting structure 200E of the attachment 10E is extruded out of the lid 20E in the radial direction thereof.

Specifically, the container 1E is exemplary to be a sport bottle. When user is using, he or she can directly open the top cover of the lid 20E to have the water or the drink in the bottle. Therefore, it is not necessary for the connecting structure 200E to simultaneously integrate rotations of the magnetic attraction member 100E and the lid 20E. Besides, in comparison of the container 1B, the connecting structure 200E does not have the positioning portion but extends outside in the radial direction of the lid 20E. In the embodiments, the connecting structure 200E may flush with the upper surface 22E. Thereby, the rotation range of the magnetic attraction member 100E is from the top of the top cover to the vertically downward direction as shown in FIG. 14, and selections of fixed positions of the mobile electronic device 2 are significantly increased.

Besides, as shown in FIG. 14, the magnetic attraction portion accommodating spaces 122E formed on the first side of the base portion 120E are not a complete ring shape but two separated arc shapes, and the shapes and sizes of the magnetic attraction portions 110E are corresponding to those of the magnetic attraction portion accommodating spaces 122E. Therefore, the mobile electronic device 2 can be also steadily magnetically connected to the magnetic attraction member 100E.

Figure 15:
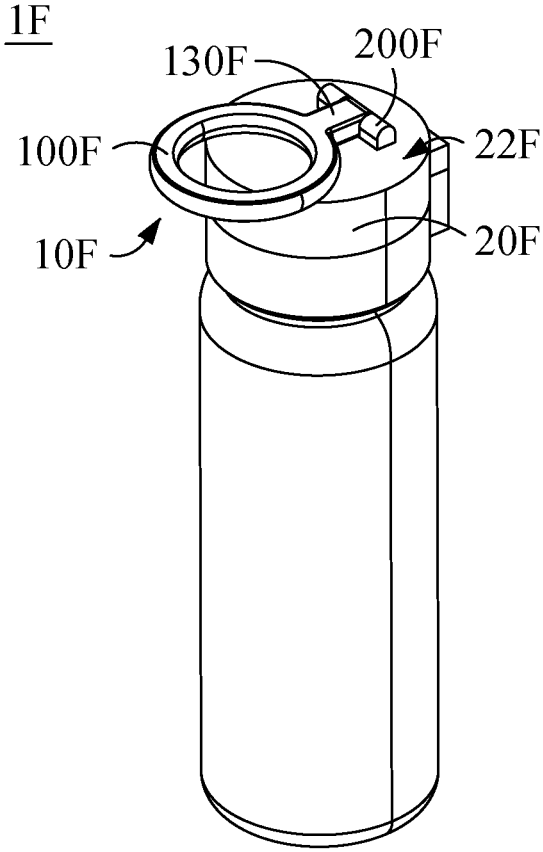
FIG. 15 is a perspective view of a container according to some exemplary embodiments.

Referring to FIG. 15. The container 1F in the embodiments is substantially similar to the container 1E in the previous embodiments. The main difference between them is that the connecting structure 200F of the attachment 10F is disposed on the upper surface 22F of the lid 20F, and that the magnetic attraction member 100F is pivoted to the connecting structure 200F through the pivoting portion 130F.

Like the container 1E, the connecting structure 200F does not have the positioning portion, either. Consequently, the rotation of the magnetic attraction member 100F can be from zero degree to 180 degrees of the upper surface 22F. Moreover, when user does not need to fix the mobile electronic device 2, the magnetic attraction member 100F can be directly pulled as a handle for picking up the container 1F, which increases the convenience in carrying of the container 1F. It is worth mentioning that the application of the handle is also adapted for the magnetic attraction member with at least a portion of ring-shaped structure in the previous or the following embodiments. Besides, in the embodiments, the connecting structure 200F is slightly biased from the center of the upper surface 22F, but it is not limited by the embodiments. In other embodiments, the connecting structure 200F may be directly disposed at the center of the upper surface 22F, and the container 1F can be more balanced when being picked.

Figure 16:
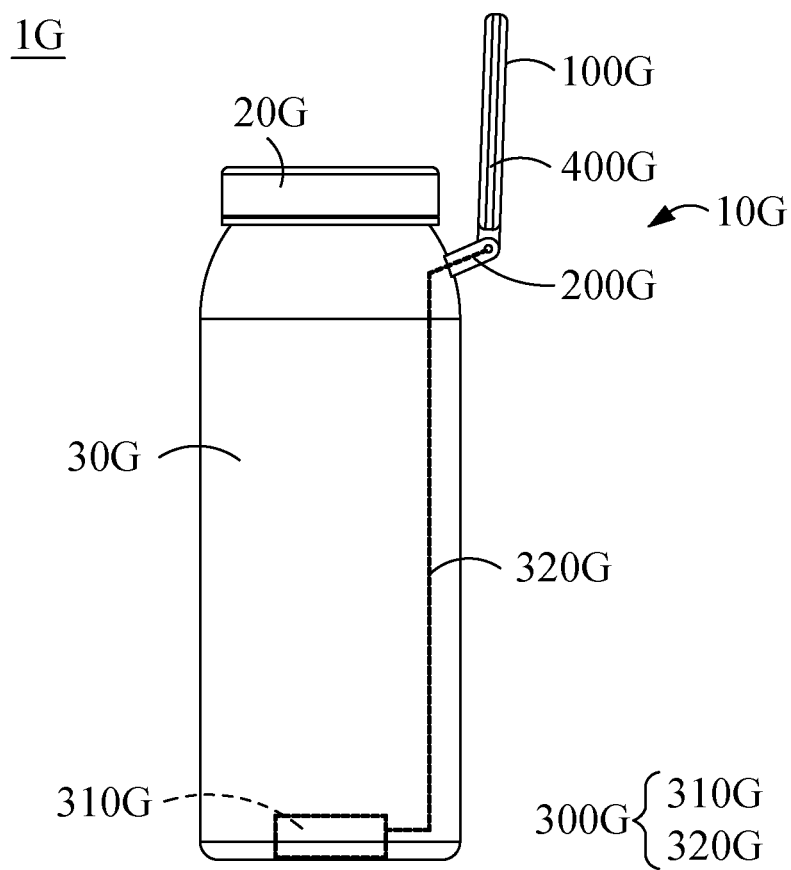
FIG. 16 is a side view of a container according to some exemplary embodiments.

Referring to FIG. 16. The container 1G in the embodiments is substantially similar to the container 1A in the previous embodiments. The main difference between them is that the connecting structure 200G of the attachment 10G is not disposed on the lid 20G, but disposed on the body portion 30G.

Specifically, user can choose the container 1G with the connecting structure 200G disposed on the lid 20G or on the body portion 30G based on usual habits of handling containers, filming or watching video. To reduce the difficulty in wiring, the chargeable battery 310G of the power storage unit 300G may be correspondingly disposed in the body portion 30G. In the embodiments, the chargeable battery 310G is exemplary to be disposed inside the bottom of the body portion 30G and connected to the electric coils 400G through the wire 320G so as to supplying or saving the power. Since the technical details of this part have been described above, they will not be repeated hereinafter.

Figure 17:
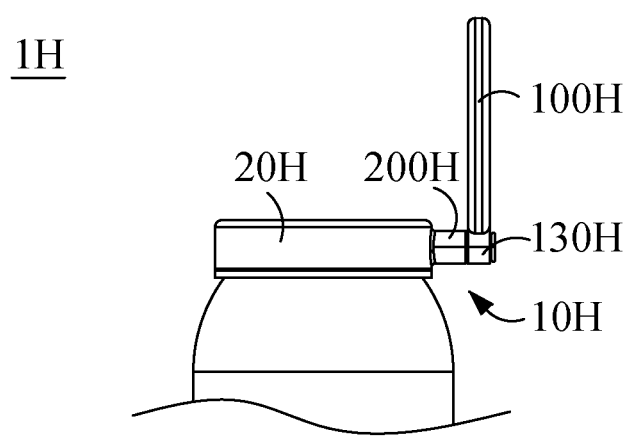
FIG. 17 is a partial side view of a container according to some exemplary embodiments.
Figure 18:
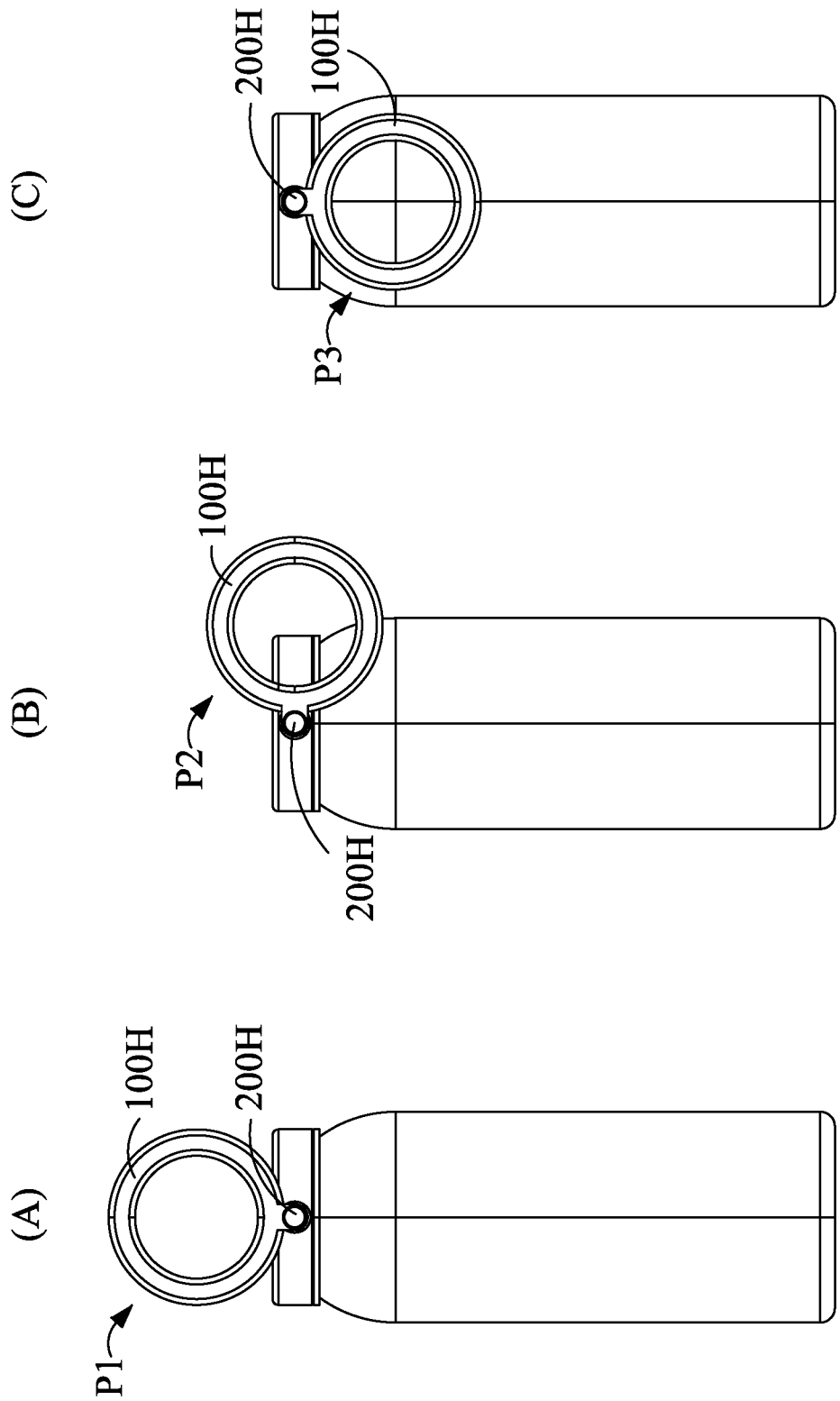
FIG. 18 is a front view of the container in FIG. 17 when the magnetic attraction member is positioned at (A) a first position; (B) a second position; and (C) a third position.

Referring to FIGS. 17 and 18. The container 1H in the embodiments is substantially similar to the container 1A in the previous embodiments. The main difference between them is that the connecting structure 200H of the attachment 10H does not include a hinge but a rotating shaft, and that the magnetic attraction member 100H is pivoted to the rotating shaft or pivoted to the lid 20H of the container 1H through the pivoting portion 130H.

Specifically, the connecting structure 200H can realize the rotation of the magnetic attraction member 100H relative to the lid 20H in two ways. The first way is that the rotating shaft is fixed at the periphery of the lid 20H, and the pivoting portion 130H is pivotally sleeved on the rotating shaft. That is, the magnetic attraction member 100H is rotatable relative to the rotating shaft. The second way is that the magnetic attraction member 100H is fixed on the rotating shaft, and the rotating shaft is pivoted to the periphery of the lid 20H. No matter which way is chosen, the magnetic attraction member 100H is rotatable and fixable among the first position P1, the second position P2 and the third position P3 shown in FIG. 18. However, the actual rotating position of the magnetic attraction member 100H is not limited by the embodiments. In other embodiments, bumps and grooves corresponding to the bumps may be disposed in the rotating shaft of the connecting structure 200H, and the corresponding indicating scale can be marked on the outer surface of the rotating shaft. Thereby, user can acknowledge the rotating position of the magnetic attraction member 100H more accurately.

Figure 19:
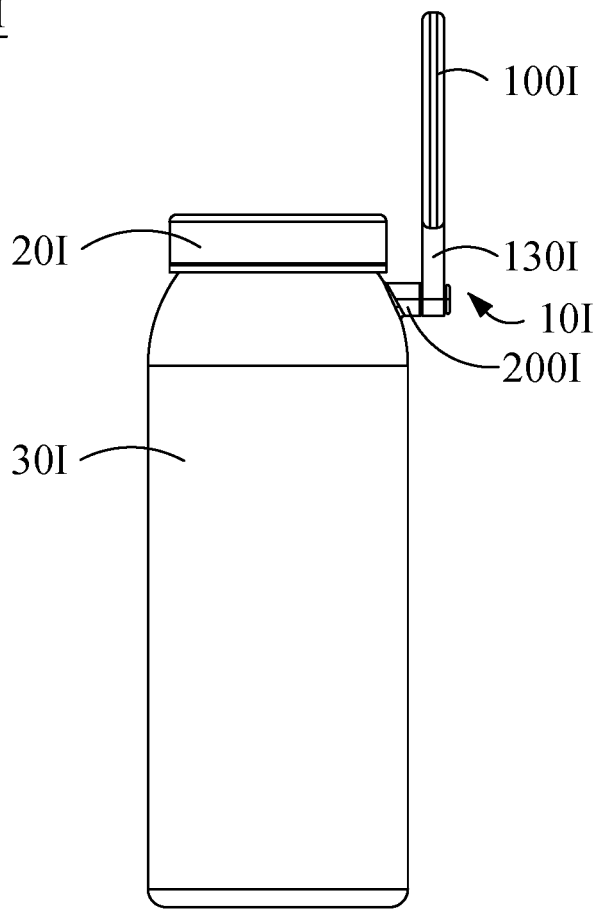
FIG. 19 is a side view of a container according to some exemplary embodiments.

Referring to FIG. 19. The container 1I in the embodiments is substantially similar to the container 1H in the previous embodiments. The main difference between them is that the connecting structure 200I of the attachment 10I is not disposed on the lid 20I, but disposed on the body portion 30I.

Like the container 1G, user can choose the container 1I with the connecting structure 200I disposed on the lid 20I or on the body portion 30I based on usual habits of handling containers, filming or watching video. Besides, the magnetic attraction member 100I is pivoted to the rotating shaft or pivoted to the body portion 30I through the pivoting portion 130I. In this way, the same effect as the container 1H can be achieved.

Figure 20:
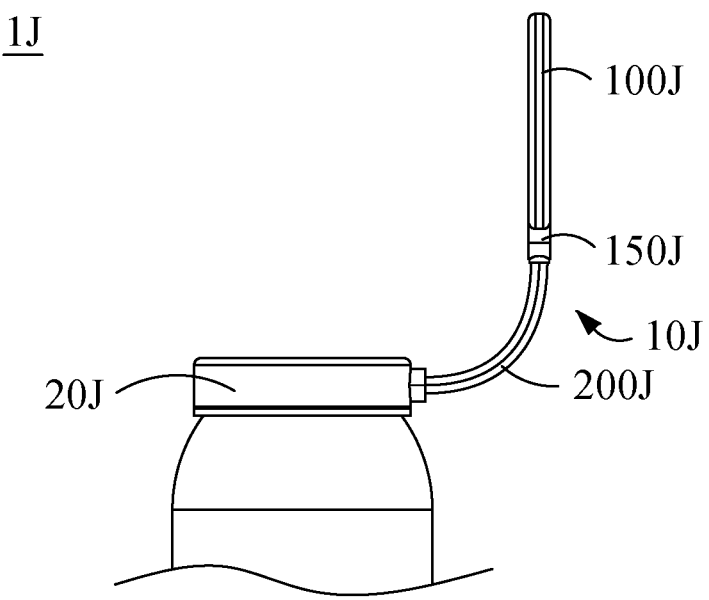
FIG. 20 is a partial side view of a container according to some exemplary embodiments.

Referring to FIG. 20. The container 1J in the embodiments is substantially similar to the container 1A in the previous embodiments. The main difference between them is that the connecting structure 200J of the attachment 10J does not include a hinge but a flexible member. One end of the flexible member is disposed on the lid 20J, and the magnetic attraction member 100J is disposed on another end of the flexible member.

Specifically, the flexible member is exemplary to be a metal hose and has the rigidity of metal material and the flexibility of tubular structure. The magnetic attraction member 100J includes a fixing portion 150J, and the magnetic attraction member 100J is fixed on the end of the flexible member away from the lid 20J through the fixing portion 150J. By the arrangement, the freedom of movement of the magnetic attraction member 100J is significantly improved except for pivoting. In addition, when the container 1J include the power storage unit or the electric coils of the container 1A or the container 1G, the wire can be disposed to pass through the metal hose, which prevents the wire from exposure outside and omits additional processes of drilling holes. It is worth mentioning that the flexible member may be chosen from solid strip structures, and the material thereof can be chosen from plastics, rubber and so on. It is not limited by the embodiments.

Figure 21:
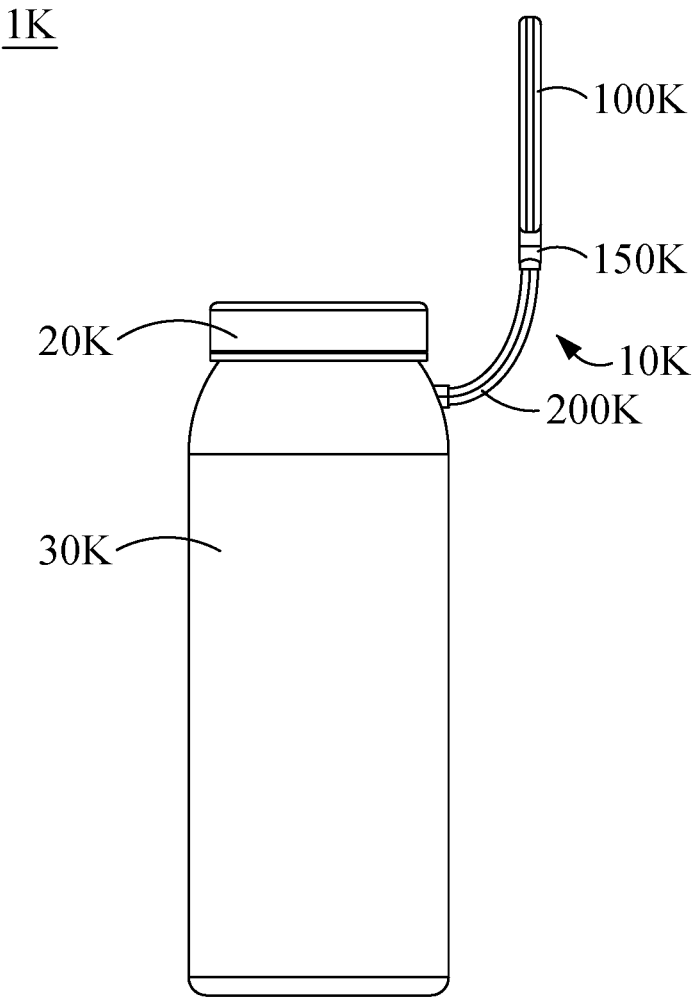
FIG. 21 is a side view of a container according to some exemplary embodiments.

Referring to FIG. 21. The container 1K in the embodiments is substantially similar to the container 1J in the previous embodiments. The main difference between them is that the connecting structure 200K of the attachment 10K is not disposed on the lid 20K, but on the body portion 30K.

Like the container 1G and the container 1I, user can choose the container 1K with the connecting structure 200K disposed on the lid 20K or on the body portion 30K based on usual habits of handling containers, filming or watching video. Besides, the magnetic attraction member 100K is fixed on the end of the flexible member away from the body portion 30K through the fixing portion 150K. In this way, the same effect as the container 1J can be achieved.

Figure 22:
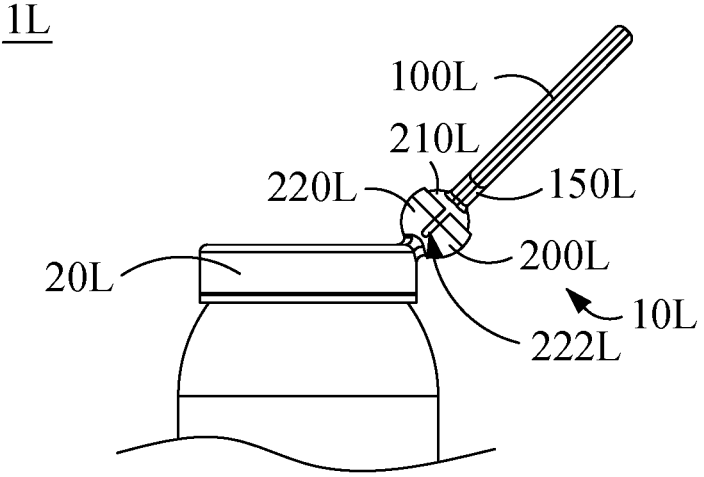
FIG. 22 is a partial side view of a container according to some exemplary embodiments.

Referring to FIG. 22. The container 1L in the embodiments is substantially similar to the container 1A in the previous embodiments. The main difference between them is that the connecting structure 200L of the attachment 10L does not include a hinge but a universal joint, and that the magnetic attraction member 100L is pivoted to the lid 20L of the container 1L through the universal joint.

Specifically, the connecting structure 200L may include a pivoting member 210L and a positioning member 220L. The pivoting member 210L is exemplary to be a ball joint of the universal joint, and the positioning member 220L is the mounting base for the ball joint and disposed on the periphery of the lid 20L. On the other hand, the magnetic attraction member 100L may include a fixing portion 150L, and the fixing portion 150L is fixed to the pivoting member 210L. Therefore, the magnetic attraction member 100L is pivoted to the lid 20L through the universal joint. In comparison of the hinge structure, the universal joint included by the connecting structure 200L additionally provides the magnetic attraction member 100L with freedom of pivoting in a direction perpendicular to rotating shaft and increases variations of phases of the mobile electronic device 2 at similar positions.

In some embodiments, bumps for positioning may be formed on the pivoting member 210L, and a positioning portion 222L may be formed on the positioning member 220L. The positioning portion 222L is exemplary to be positioning grooves for engaging the bumps. Thereby, when the bumps on the pivoting member 210L rotate into the positioning portion 222L, the magnetic attraction member 100L can be fixed at a specific position.

Figure 23:
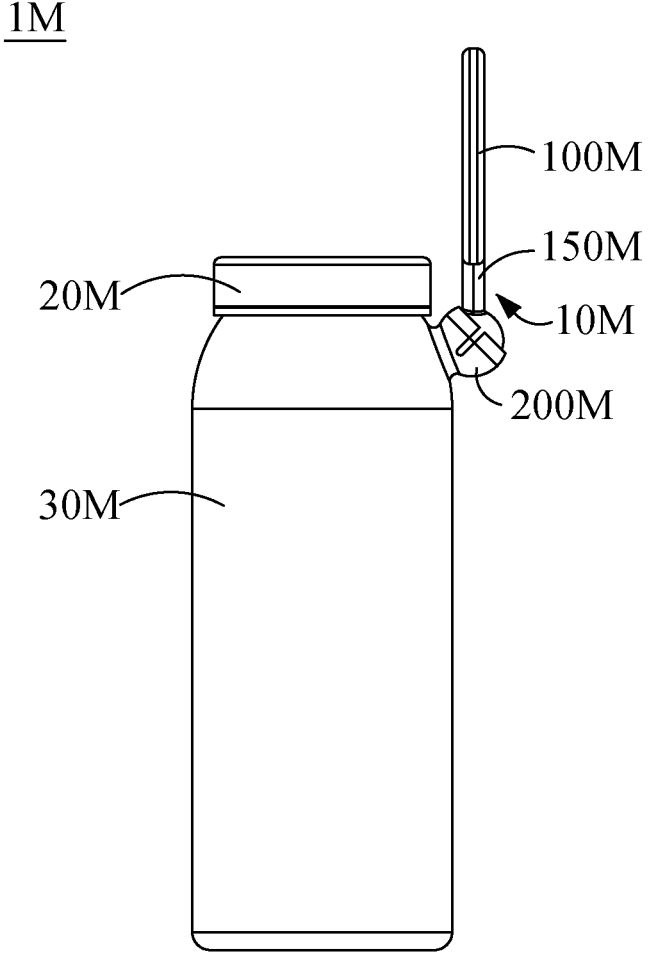
FIG. 23 is a side view of a container according to some exemplary embodiments.

Referring to FIG. 23. The container 1M in the embodiments is substantially similar to the container 1L in the previous embodiments. The main difference between them is that the connecting structure 200M of the attachment 10M is not disposed on the lid 20M, but on the body portion 30M.

Like the containers with the connecting structures disposed on the body portions, user can choose the container 1M with the connecting structure 200M disposed on the lid 20M or on the body portion 30M based on usual habits of handling containers, filming or watching video. Besides, the magnetic attraction member 100M is pivoted on the body portion 30M through the fixing portion 150M and the connecting structure 200M. In this way, the same effect as the container 1L can be achieved.

Figure 24:
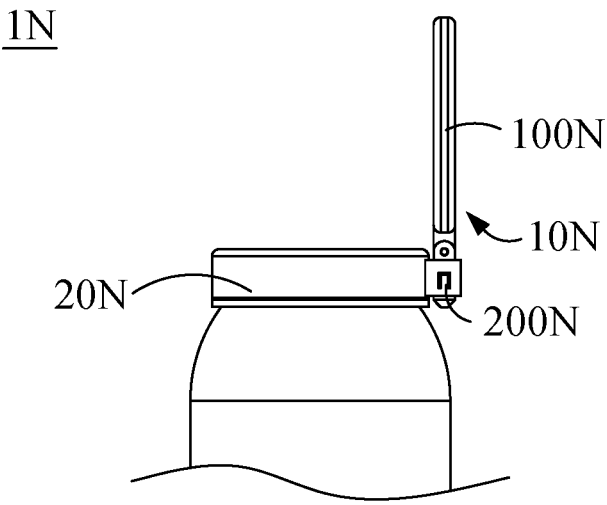
FIG. 24 is a partial side view of a container according to some exemplary embodiments.

Referring to FIG. 24. The container 1N in the embodiments is substantially similar to the container 1A in the previous embodiments. The main difference between them is that the connecting structure 200N of the attachment 10N does not include a hinge but a combination of a plug and a socket, and that the magnetic attraction member 100N is pivotally disposed on the lid 20N through the connecting structure 200N.

Figure 25:
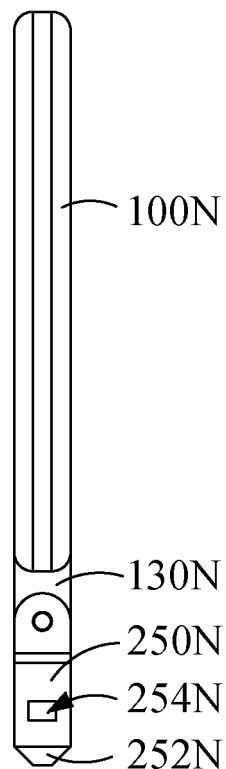
FIG. 25 is a side view of partial components of the container in FIG. 24.
Figure 26:
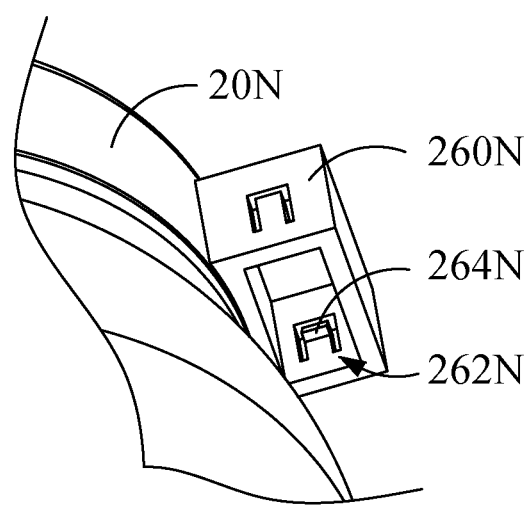
FIG. 26 is an enlarged view of the container in FIG. 24 with respect to another viewpoint.

Referring to FIGS. 25 and 26. Specifically, the connection between the magnetic attraction member 100N and the lid 20N can be realized by the following ways. As shown in FIG. 25, the magnetic attraction member 100N may include a pivoting portion 130N, and the connecting structure 200N may include a clamping member 250N and a mounting member 260N. The clamping member 250N may include a plug 252N, and the pivoting portion 130N is pivoted to the end of the clamping member 250N away from the plug 252N. Besides, as shown in FIG. 26, the mounting member 260N is fixed on the periphery of the lid 20N, and a socket 262N corresponding to the plug 252N is formed in the mounting member 260N. By the arrangement, when user needs to fix the mobile electronic device 2, the plug 252N of the clamping member 250N pivoted to the magnetic attraction member 100N can be inserted into the socket 262N of the mounting member 260N so as to engage the clamping member 250N with the mounting member 260N. Meanwhile, the magnetic attraction member 100N is rotatable relative to the mounting member 260N and the lid 20 through the pivoting connection between the pivoting portion 130N and the clamping member 250N to realize a rotating manner similar to that of the connecting structure 200A. Besides, the pivoting portion 130N may be also fixed relative to the clamping member 250N, and the mounting member 260N is pivoted on the periphery of the lid 20N. Thereby, when the plug 252N is inserted into the socket 262N, the magnetic attraction member 100N can realize a rotating manner similar to that of the connecting structure 200H through the rotation of the mounting member 260N relative to the lid 20N. Otherwise, the two ways mentioned above may be also integrated. That is, the magnetic attraction member 100N is rotatable relative to the clamping member 250N through the pivoting portion 130N, the mounting member 260N is also rotatable relative to the lid 20N, and freedom of rotation in two different directions is thus available.

Besides, as shown in FIGS. 25 and 26, a clamping portion 254N may be formed on the clamping member 250N, and a clamping feature 264N corresponding to the clamping portion 254N may be formed in the socket 262N of the mounting member 260N. In the embodiments, the clamping portions 254N are exemplary to be snapping slots, the clamping features 264N are exemplary to be snapping hooks, and numbers of them may be two, respectively. Thereby, when the clamping member 250N and the mounting member 260N combine with each other, the magnetic attraction member 100N can be fixed at a specific position by the engagement between the clamping portions 254N and the clamping features 264N. Besides, based on actual needs, the clamping portions 254N and the clamping features 264N may be altered to other clamping structures such as bumps or grooves. The configuration facilitates users to rapidly detach the clamping member 250N attached with the magnetic attraction member 100N from the mounting member 260N when they do not need to fix the mobile electronic device 2, and each component of the container 1N is convenient in carrying. Similarly, based on actual needs, the connecting structure 200N may also be disposed on the body portion of the container 1N.

Figure 27:
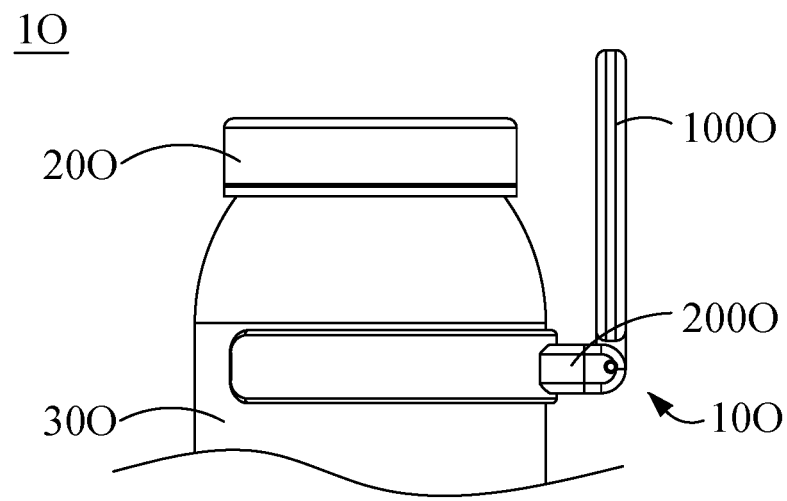
FIG. 27 is a partial side view of a container according to some exemplary embodiments.
Figure 28:
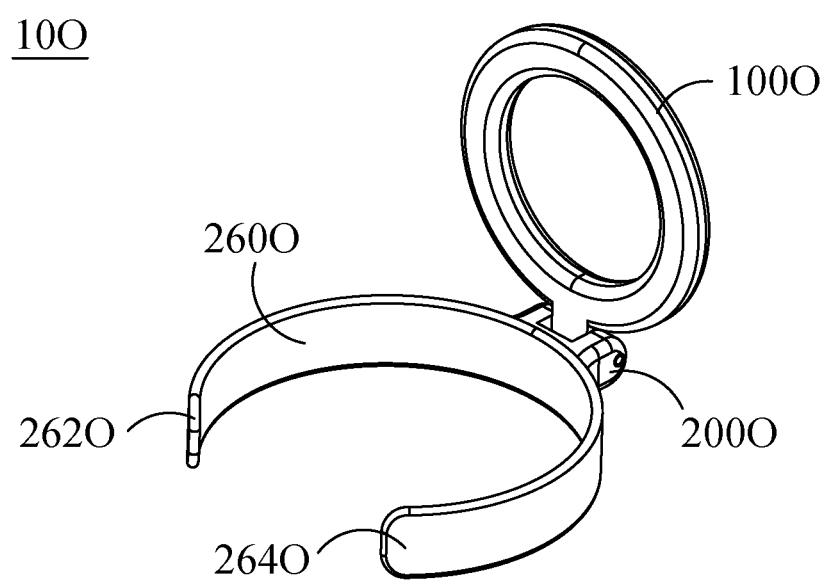
FIG. 28 is a perspective view of the magnetic attraction member and the connecting structure in FIG. 27.

Referring to FIGS. 27 and 28. The container 1O in the embodiments is substantially similar to the container 1G in the previous embodiments. The main difference between them is that the connecting structure 200O of the attachment 10O includes a fastening member 260O. The magnetic attraction member 100O is pivoted to the fastening member 260O, and the fastening member 260O is adapted to be detachably fastened on the container 1O.

As shown in FIG. 28, the fastening member 260O may be made of plastics or elastic metals or alloys such as nickel and titanium. It may be C-shaped and capable of surrounding a fastening area with a dimension substantially equal to or slightly smaller than the outer diameter of the body portion 30N in an unloaded state. More specifically, the fastening member 260O may include a first end 262O and a second end 264O. When the fastening member 260O covers the body portion 30O, a clearance is selectively formed between the first end 262O and the second end 264O, and the clearance may expand or shrink according to the outer diameter of the body portion 30O. As user needs to fix the mobile electronic device 2 through the magnetic attraction member 100O, the fastening member 260O can be fastened on the peripheral surface of the body portion 30O. Thereby, the connecting structure 200O can be fixed on the body portion 30O, and the magnetic attraction member 100O is rotatable relative to the body portion 30O by the pivoting connection with respect to the fastening member 260O. By the arrangement, when the container 1O is a water bottle with a substantially constant outer diameter of the body portion 30O, user can freely adjust the height of the attachment 10O relative to the body portion 30O based on actual needs. Even if the outer diameter of the body portion 30O varies a little, since the fastening member 260O is made of elastic materials, and a clearance is formed between the first end 262O and the second end 264O, the fastening member 260O can expand or shrink according to the outer diameter of the body portion 30O and keep fitting on the peripheral surface of the body portion 30O. As user does not need to fix the mobile electronic device 2, the magnetic attraction member 100O and the connecting structure 200O can be rapidly detached from the body portion 30O, and the using flexibility and convenience are significantly increased. Similarly, based on actual needs, the connecting structure 200O may also be disposed on the lid 20O of the container 1O.

Figure 29:
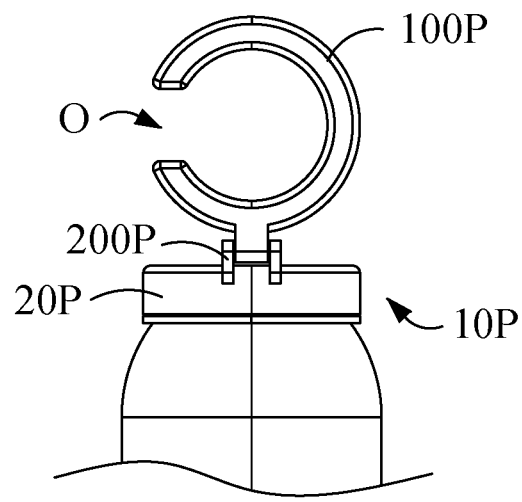
FIG. 29 is a partial front view of a container according to some exemplary embodiments.

Referring to FIG. 29. The container 1P in the embodiments is substantially similar to the container 1A in the previous embodiments. The main difference between them is that the magnetic attraction member 100P of the attachment 10P is C-shaped instead of the closed ring-shaped magnetic attraction members in the previous embodiments.

Specifically, an opening O is formed between the head end and the tail end of the magnetic attraction member 100P, and the magnetic attraction member 100P is pivoted on the periphery of the lid 20P through the connecting structure 200P. Thereby, when user needs to hang the container 1P on a hook on a scooter or a wall, the hook can pass through the opening O into the magnetic attraction member 100P, and the using convenience is enhanced. It is worth mentioning that even if the magnetic attraction member 100P is not formed to closed ring-shaped, once the magnetic strength of the magnetic attraction member 100P is adjusted to a feasible range, the mobile electronic device 2 can be also steadily magnetically connected to the magnetic attraction member 100P.

Figure 30:
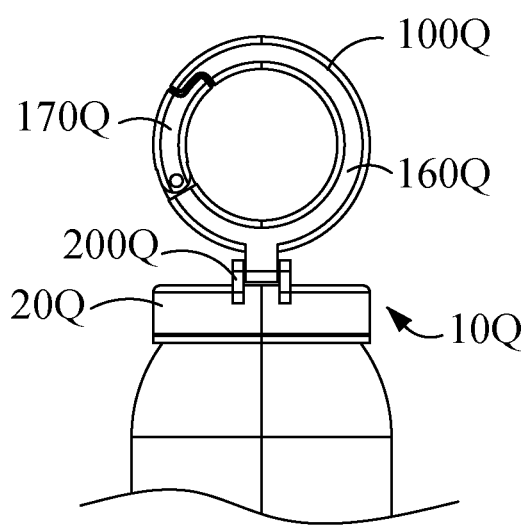
FIG. 30 is a partial front view of a container according to some exemplary embodiments.
Figure 31:
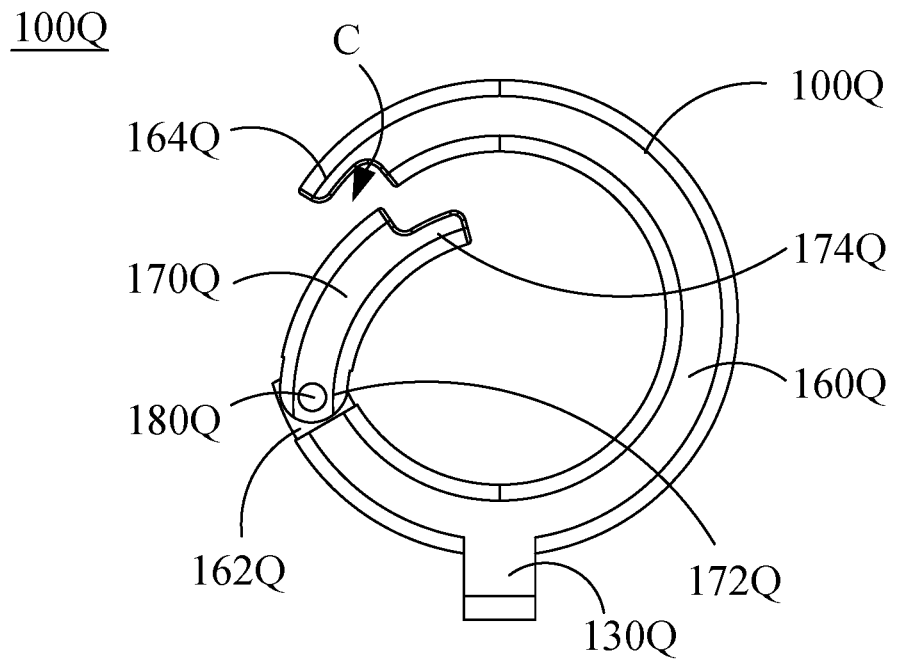
FIG. 31 is a front view of the magnetic attraction member in FIG. 30 when the biasing portion rotates relative to the main body portion.

Referring to FIGS. 30 and 31. The container 1Q in the embodiments is substantially similar to the container 1A in the previous embodiments. The main difference between them is that a clearance C is selectively formed in the magnetic attraction member 100Q of the attachment 10Q.

As shown in the figure, the magnetic attraction member 100Q is pivoted on the periphery of the lid 20Q through the pivoting portion 130Q and the connecting structure 200Q, and the magnetic attraction member 100Q may further include a main body portion 160Q and a biasing portion 170Q. The main body portion 160Q is exemplary a ring-shaped structure with a notch, and the biasing portion 170Q is exemplary to be a complement to the notch of the main body portion 160Q. Both of them can form a closed ring, together. More specifically, the main body portion 160Q may include a first end 162Q and a second end 164Q, and the biasing portion 170Q may include a third end 172Q and a fourth end 174Q. The third end 172Q is pivoted to the first end 162Q. Thereby, when the biasing portion 170Q rotates relative to the main body portion 160Q around the third end 172Q as a pivot, a clearance C can be selectively formed between the fourth end 174Q and the second end 164Q. When user needs to hang the magnetic attraction member 100Q on the hook mentioned above, the biasing portion 170Q can be operated to form the clearance C, and the hook is allowed to pass through the clearance C into the magnetic attraction member 100Q. The biasing portion 170Q and the main body portion 160Q can be recovered to closed ring-shaped after hanging to prevent the hook from being detached through the clearance C.

In some embodiments, the magnetic attraction member 100Q may further include a biasing member 180Q. The biasing member 180Q is exemplary to be a torsion spring and disposed between the third end 172Q and the first end 162Q. By the arrangement, when user does not operate the biasing portion 170Q, the biasing member 180Q will drive the biasing portion 170Q to rotate to combine with the main body portion 160Q based on stored elasticity, and the using convenience of the magnetic attraction member 100Q is thus improved.

Figure 32:
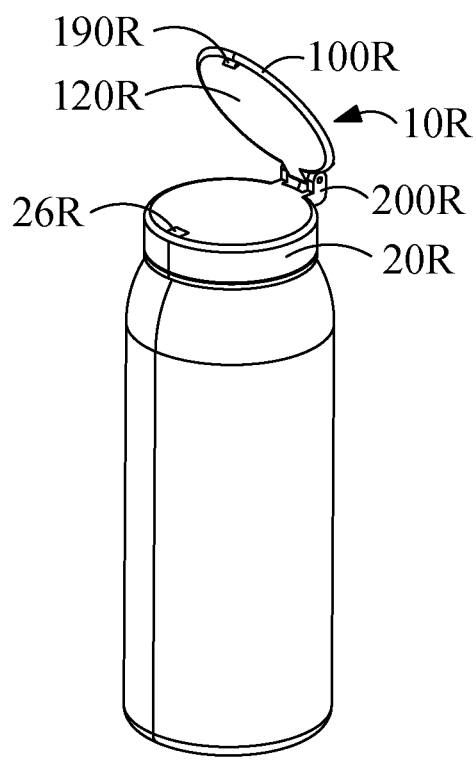
FIG. 32 is a perspective view of a container according to some exemplary embodiments.

Referring to FIG. 32. The container 1R in the embodiments is substantially similar to the container 1A in the previous embodiments. The main difference between them is that the magnetic attraction member 100R of the attachment 10R is a sheet-shaped component. The magnetic attraction member 100R is pivoted to the lid 20R through the connecting structure 200R.

Specifically, although the magnetic portion 22 of the mobile electronic device 2 is distributed to be ring shape, the area of the magnetic attraction member 100R may be corresponding to part of the magnetic portion 22 (e.g., the magnetic attraction member 100P), all of the magnetic portion 22 (e.g., the closed ring-shaped magnetic attraction members mentioned above), or larger than the area of the magnetic portion 22 like the magnetic attraction member 100R in the embodiments. On the other hand, in some embodiments, components such as a mirror may be coated on the first side of the base portion 120R close to the lid 20R, and the mobile electronic device 2 is magnetically connected to the magnetic attraction member 100R by the second side away from the lid 20R. Thereby, users can check their posture through the mirror on the first side, or groom or makeup as they are filming or watching video through the mobile electronic device 2.

Furthermore, as shown in FIG. 32, the magnetic attraction member 100R may further include an engaging portion 190R. The engaging portion 190R is exemplary to be a hook, and an engaging feature 26R corresponding to the engaging portion 190R may be formed on the lid 20R. The engaging feature 26R is exemplary to be a slot. By the arrangement, when user does not need to magnetically connect the mobile electronic device 2 through the magnetic attraction member 100R, the magnetic attraction member 100R can be rotated to a position close to the lid 20R (e.g., the first position P1 in FIG. 4) so as to engage the engaging portion 190R with the engaging feature 26R. In other words, the container 1R can selectively engage the magnetic attraction member 100R with the lid 20R to prevent the magnetic attraction member 100R from colliding with external components to be damaged. It is worth mentioning that the engaging feature 26R may be formed on the body portion of the container 1R. It is not limited by the embodiments.

Figure 33:
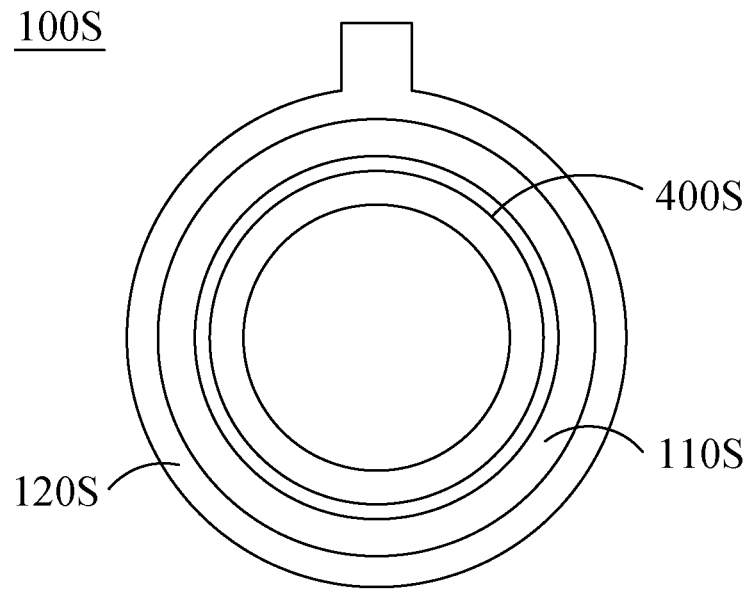
FIG. 33 is a top view of a magnetic attraction member of a container according to some exemplary embodiments.

Referring to FIG. 33. The magnetic attraction member 100S in the embodiments is substantially similar to the magnetic attraction member 100A in the previous embodiments. The main difference between them is that the magnetic attraction portion 110S is disposed on the base portion 120S, and that the electric coils 400S are disposed on the magnetic attraction member 100S.

Specifically, in the embodiments, the magnetic attraction portion 110S is strip-shaped and is capable of being attached to the outer surface of the base portion 120S. In addition, the electric coils 400S are also disposed on the outer surface of the base portion 120S. Thereby, the magnetic attraction portion 110S and the electric coils 400S can be closer to the mobile electronic device 2 during the magnetic connection so as to lower the risk of dropping of magnetic strength or electric power as they are wrapped in the base portion 120S.

Figure 34:
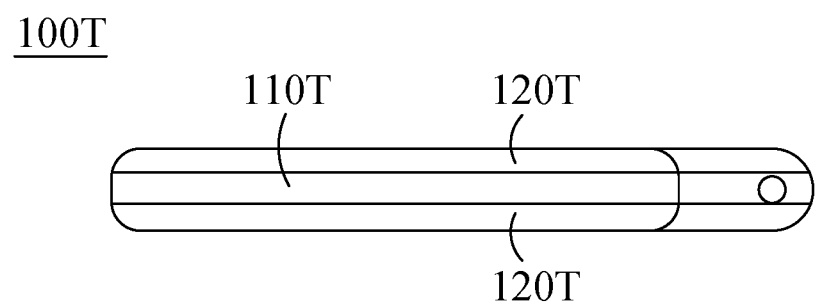
FIG. 34 is a side view of a magnetic attraction member of a container according to some exemplary embodiments.

Referring to FIG. 34. The magnetic attraction member 100T in the embodiments is substantially similar to the magnetic attraction member 100A in the previous embodiments. The main difference between them is that the magnetic attraction portion 110T is not entirely disposed in the base portion 120T, but stacks up with the base portion 120T.

Specifically, when manufacturers make the magnetic attraction member 100T, a plurality of layers of the magnetic attraction portion 110T and the base portion 120T can be respectively formed by molds, and the magnetic attraction portions 110T and the base portions 120T are combined through various ways such as die-casting, welding, gluing or locking. Thereby, the processes of fabricating the base portion 120T and disposing the magnetic attraction portion 110T in the base portion 120T can be simplified.

Figure 35:
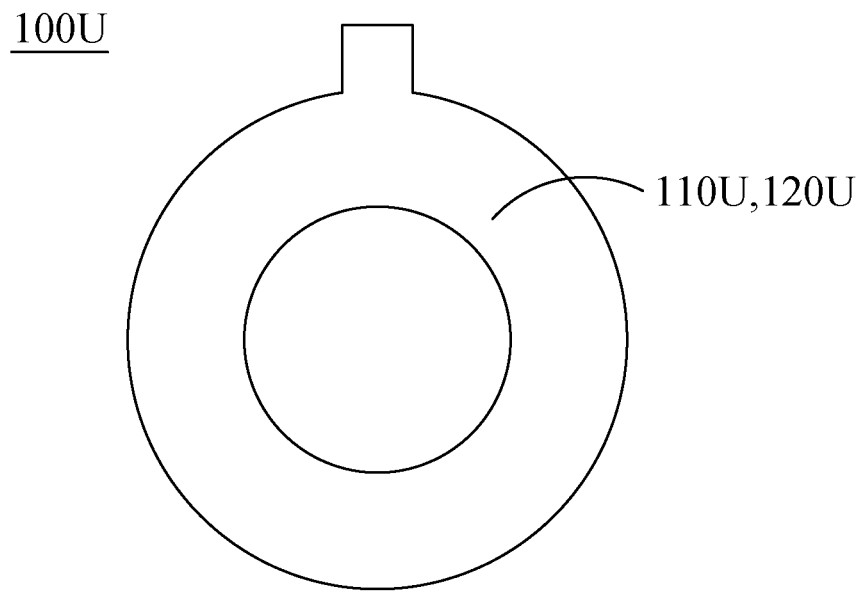
FIG. 35 is a top view of a magnetic attraction member of a container according to some exemplary embodiments.

Referring to FIG. 35. The magnetic attraction member 100U in the embodiments is substantially similar to the magnetic attraction member 100A in the previous embodiments. The main difference between them is that the magnetic attraction member 100U is homogeneous.

Specifically, the magnetic attraction member 100U may include magnetic powder 110U and a polymeric material 120U. The magnetic powder 110U can be also replaced by ferromagnetic powder or ferrimagnetic powder adapted to be attracted by an external magnetic field. After mixed and blended properly, the mixture can form the magnetic attraction member 100U in one shot by injection molding. By the arrangement, the fabrication process speed of magnetic attraction member 100U can be significantly increased. Besides, the precisions of surface and dimension of the magnetic attraction member 100U are also promoted, and the magnetic attraction member 100U capable of being magnetically connected to the mobile electronic device 2 can be manufactured by less magnetic, ferromagnetic or ferrimagnetic material. The manufacturing cost is thus reduced.

Figure 36:
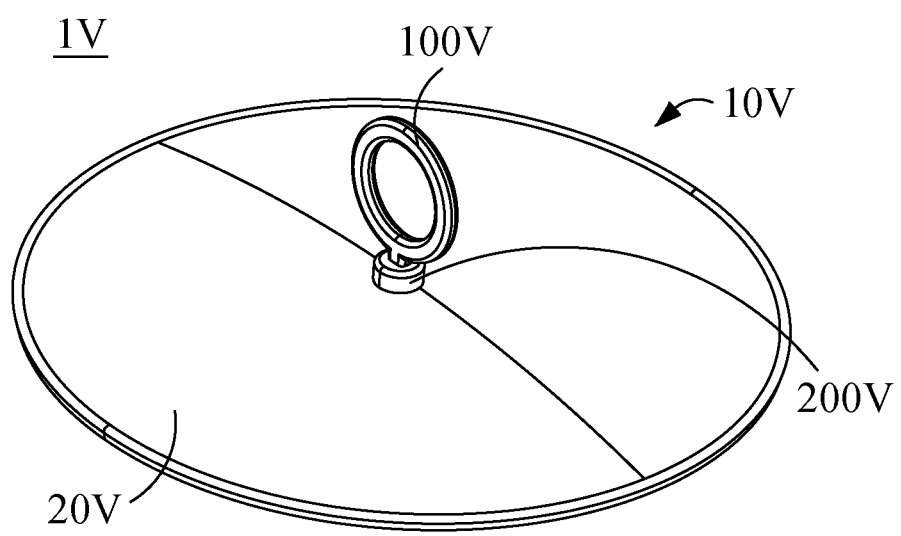
FIG. 36 is a perspective view of partial components of a container according to some exemplary embodiments.

Referring to FIG. 36. The container 1V in the embodiments is substantially similar to the container 1A in the previous embodiments. The main difference between them is that the container 1V is not a water bottle but a pan.

Specifically, besides, the water bottle or the sport bottle mentioned above, the container may also be a vacuum flask, a pan, a wok, a pot, a kettle or a can, and the lid 20V is a lid corresponding to the containers. Besides, in the embodiments, the magnetic attraction member 100V of the attachment 10V is exemplary to be pivoted at a center of the lid 20V through the connecting structure 200V. Thereby, users can also use mobile electronic device 2 and free up their hands to proceed cooking steps when they are cooking.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. An attachment adapted for a container for containing food or liquid, the container having a lid, and the attachment comprising:
   a magnetic attraction member independent from the lid and adapted to be magnetically connected to a mobile electronic device; and
   a connecting structure disposed between the magnetic attraction member and the container for selectively fixing the magnetic attraction member at a first position or a second position, wherein at least a portion of the connecting structure is fixed to the container.

2. The attachment according to claim 1, wherein the magnetic attraction member comprises a magnetic attraction portion and a base portion, the magnetic attraction portion and the base portion stack up, or the magnetic attraction portion is accommodated in the base portion.

3. The attachment according to claim 2, wherein at least one magnetic attraction portion accommodating space is formed on the base portion, and the magnetic attraction portion is accommodated in the at least one magnetic attraction portion accommodating space.

4. The attachment according to claim 3, wherein the at least one magnetic attraction portion accommodating space is plural, and the magnetic attraction portion is detachably disposed in one of the plurality of the magnetic attraction portion accommodating spaces.

5. The attachment according to claim 2, wherein the magnetic attraction portion is a permanent magnet or an electro-magnet, or the magnetic attraction portion is a ferromagnetic material or a ferrimagnetic material adapted to be attracted by an external magnetic field.

6. The attachment according to claim 1, wherein the magnetic attraction member is homogeneous.

7. The attachment according to claim 6, wherein the magnetic attraction member comprises magnetic powder, or the magnetic attraction member comprises ferromagnetic powder or ferrimagnetic powder adapted to be attracted by an external magnetic field.

8. The attachment according to claim 6, wherein the magnetic attraction member comprises a polymeric material.

9. The attachment according to claim 6, wherein the magnetic attraction member is manufactured by injection molding.

10. The attachment according to claim 1, wherein the magnetic attraction member comprises a positioning magnetic attraction portion, and the positioning magnetic attraction portion is configured to be magnetically connected to a positioning feature of the electronic mobile device.

11. The attachment according to claim 10, wherein a positioning magnetic attraction accommodating portion configured to accommodate the positioning magnetic attraction portion is formed on the container.

12. The attachment according to claim 1, further comprising a power storage unit and electric coils, wherein the electric coils are disposed at the magnetic attraction member and electrically connected to the power storage unit, and the power storage unit is adapted to provide electricity to the electronic mobile device through the electric coils or store electricity received from the electronic mobile device.

13. The attachment according to claim 12, wherein the power storage unit comprises a chargeable battery and a wire, and the wire is connected between the chargeable battery and the electric coils and passes through the connecting structure.

14. The attachment according to claim 1, wherein the magnetic attraction member comprises a main body portion and a biasing portion, an end of the biasing portion is pivoted to an end of the main body portion, and a clearance is selectively formed between another ends of the biasing portion and the main body portion.

15. The attachment according to claim 14, wherein the magnetic attraction member further comprises a biasing member disposed between the biasing portion and the main body portion.

16. The attachment according to claim 1, wherein a magnetic attraction member accommodating portion configured to accommodate the magnetic attraction member is formed on the container.

17. The attachment according to claim 1, wherein the magnetic attraction member comprises an engaging portion configured to be selectively engaged to the container.

18. The attachment according to claim 1, wherein the magnetic attraction member is a MAGSAFE compatible interface.

19. The attachment according to claim 1, wherein the magnetic attraction member is C-shaped or closed ring-shaped.

20. The attachment according to claim 1, wherein the connecting structure comprises a positioning member configured to fix the magnetic attraction member at the first position or the second position.

21. The attachment according to claim 1, wherein the magnetic attraction member comprises a pivoting feature, and the connecting structure comprises a damping member engaged with the pivoting feature.

22. The attachment according to claim 1, wherein the connecting structure comprises a hinge, a rotating shaft or a plug, and the magnetic attraction member is pivoted to the hinge, the rotating shaft or the plug.

23. The attachment according to claim 1, wherein the connecting structure comprises a hinge, a rotating shaft, a universal joint or a socket, and the magnetic attraction member is pivoted to the container through the hinge, the rotating shaft, the universal joint or the socket.

24. The attachment according to claim 1, wherein the connecting structure comprises a flexible member, an end of the flexible member is disposed at the container, and the magnetic attraction member is disposed on another end of the flexible member.

25. The attachment according to claim 1, wherein the connecting structure comprises a position limiting portion selectively abutting against the magnetic attraction member.

26. The attachment according to claim 1, wherein the container further comprises a body portion, the lid is detachably disposed on the body portion, and the connecting structure is disposed on the lid or the body portion.

27. A container for containing food or liquid, comprising:
a body portion;
a lid detachably disposed on the body portion; and
an attachment according to claim 1 configured to be disposed on the lid or the body portion.

28. The container according to claim 27, wherein the container is a water bottle, a kettle, a pan, a pot or a can.

29. A lid adapted for the attachment according to claim 1, wherein the container comprises a body portion, and the lid is detachably disposed on the body portion.

* * * * *